(12) United States Patent
Sahnoune et al.

(10) Patent No.: US 9,938,400 B2
(45) Date of Patent: Apr. 10, 2018

(54) PROPYLENE COPOLYMERS IN SOFT THERMOPLASTIC BLENDS

(75) Inventors: Abdelhadi Sahnoune, Houston, TX (US); Sudhin Datta, Houston, TX (US); Mun Fu Tse, Seabrook, TX (US); Charles L. Sims, Houston, TX (US); James N. Coffey, League City, TX (US); Peijun Jiang, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 653 days.

(21) Appl. No.: 12/108,336

(22) Filed: Apr. 23, 2008

(65) Prior Publication Data

US 2009/0270545 A1 Oct. 29, 2009

(51) Int. Cl.
C08L 23/00 (2006.01)
C08L 23/10 (2006.01)
C08L 23/14 (2006.01)

(52) U.S. Cl.
CPC ............ *C08L 23/10* (2013.01); *C08L 23/14* (2013.01); *C08L 23/142* (2013.01)

(58) Field of Classification Search
CPC .................................................. C08L 23/10
USPC ........................................................ 525/240
See application file for complete search history.

(56) References Cited

U.S. PATENT DOCUMENTS

| | | | |
|---|---|---|---|
| 3,830,767 A | 8/1974 | Condon | |
| 4,006,116 A | 2/1977 | Dominguez | |
| 4,311,628 A | 1/1982 | Abdou-Sabet et al. | |
| 4,540,753 A | 9/1985 | Cozewith et al. | |
| 4,849,473 A * | 7/1989 | Cigna et al. | 525/86 |
| 5,008,332 A * | 4/1991 | Sano et al. | 525/92 D |
| 5,017,714 A | 5/1991 | Welborn, Jr. | |
| 5,036,034 A | 7/1991 | Ewen | |
| 5,057,475 A | 10/1991 | Canich et al. | |
| 5,145,819 A | 9/1992 | Winter et al. | |
| 5,153,157 A | 10/1992 | Hlatky et al. | |
| 5,198,401 A | 3/1993 | Turner et al. | |
| 5,278,119 A | 1/1994 | Turner et al. | |
| 5,304,614 A | 4/1994 | Winter et al. | |
| 5,387,568 A | 2/1995 | Ewen et al. | |
| 5,510,502 A | 4/1996 | Sugano et al. | |
| 5,747,592 A | 5/1998 | Huff et al. | |
| 5,777,012 A * | 7/1998 | Wideman et al. | 524/261 |
| 5,804,665 A * | 9/1998 | Watanabe et al. | 525/323 |
| 6,001,455 A * | 12/1999 | Nishio et al. | 428/156 |
| 6,268,438 B1 * | 7/2001 | Ellul et al. | 525/240 |
| 6,288,171 B2 | 9/2001 | Finerman et al. | |
| 6,602,957 B2 * | 8/2003 | Hattori et al. | 525/191 |
| 7,026,405 B2 * | 4/2006 | Cozewith et al. | 525/240 |
| 1,361,250 A1 | 6/2006 | Zanka et al. | |
| 7,105,603 B2 * | 9/2006 | Dharmarajan et al. | 525/191 |
| 7,217,766 B2 * | 5/2007 | Datta et al. | 525/191 |
| 7,351,769 B2 * | 4/2008 | Park | 525/199 |
| 2004/0253464 A1 | 12/2004 | Krawinkel | |
| 2005/0054781 A1 | 3/2005 | Dharmarajan et al. | |
| 2005/0277738 A1 * | 12/2005 | Hoyweghen | C08L 23/16 525/191 |
| 2007/0083007 A1 * | 4/2007 | Jacob | 525/88 |
| 2007/0240605 A1 | 10/2007 | Iyer et al. | |
| 2007/0244276 A1 | 10/2007 | Datta et al. | |
| 2008/0011709 A1 * | 1/2008 | Ibayashi et al. | 215/316 |
| 2008/0319130 A1 | 12/2008 | Chang | |
| 2009/0118451 A1 * | 5/2009 | Fuchs et al. | 526/351 |
| 2009/0182105 A1 * | 7/2009 | Stadlbauer et al. | 526/126 |

FOREIGN PATENT DOCUMENTS

| | | |
|---|---|---|
| EP | 0 426 637 B | 4/1995 |
| EP | 0 520 732 B | 12/1995 |
| EP | 0 427 697 B | 5/1996 |
| EP | 0 495 375 B | 2/1997 |
| EP | 0 573 403 B | 11/1998 |
| EP | 0 742 227 | 3/2001 |
| GB | 1 230 297 | 4/1971 |
| GB | 1 373 711 | 11/1974 |
| JP | 58-20664 | 2/1983 |
| JP | 58-215446 | 12/1983 |
| JP | 2004-250578 | 9/2004 |
| WO | 92/00333 A | 1/1992 |
| WO | WO 2004/035681 | 4/2004 |
| WO | WO 2006/020309 | 2/2006 |
| WO | WO 2007/082571 | 7/2007 |

OTHER PUBLICATIONS

Randall, J. "*A Review of High Resolution Liquid $^{13}$Carbon Nuclear Magnetic Resonance Characterizations of Ethylene-Based Polymers—Chapter IX: Long-Chain Branching in Polyethylene*", Journal of Macromolecular Science, Part C: Polymer Reviews, vol. 29, Nos. 2-3, pp. 285-297 (1989).

Sun, T. et al., "*Effect of Short Chain Branching on the Coil Dimensions of Polyolefins in Dilute Solution*", Macromolecules, vol. 34, No. 19, pp. 6812-6820 (2001).

* cited by examiner

Primary Examiner — Irina Krylova

(57) ABSTRACT

Thermoplastic polyolefins (TPOs) and/or thermoplastic vulcanizates (TPVs) are blended with low molecular weight propylene-dominated copolymers to provide polymeric compositions with an improved balance between processability and toughness. The compositions have improved processability by facilitating the ease with which a TPO or TPV, usually difficult to melt process, can be processed at high line speeds, which in turn improves the formation of the composition into articles.

20 Claims, No Drawings

US 9,938,400 B2

PROPYLENE COPOLYMERS IN SOFT THERMOPLASTIC BLENDS

FIELD OF THE INVENTION

The invention relates to the modification of thermoplastic olefins (TPOs), impact copolymers (ICPS) and thermoplastic vulcanizates (TPVs) from the admixture of a thermoplastic polyolefin and an elastomer for improved flowability and toughness. More particularly the invention relates to modification of TPOs, ICPs and TPVs with a random propylene copolymer.

BACKGROUND OF THE INVENTION

Thermoplastic olefins (TPOs), impact copolymers (ICPs) and thermoplastic vulcanizates (TPVs), collectively referred to herein as heterophase polymer compositions, thermoplastic elastomers and/or soft thermoplastic blends (STPBs), comprise an isotactic polypropylene thermoplastic phase and a high molecular weight or crosslinked elastomeric phase. The STPBs also commonly includes non-polymeric components such as fillers and other compounding ingredients.

STPBs are multiphase polymer blends where a thermoplastic such as isotactic polypropylene forms a continuous matrix phase and an elastomer, such as an ethylene containing interpolymer, is the dispersed phase. The polypropylene matrix imparts tensile strength and chemical resistance to the STPBs, while the elastomer imparts flexibility and impact resistance. A distinction between these members of STPBs, (e.g. TPVs, TPOs and ICPs) is some have a dispersed phase which is not crosslinked, or is only modestly crosslinked, others have crosslinked dispersed phases. TPOs are made by mechanical and post polymerization blending of the components while ICPs are made during the polymerization by differential polymerization of the polymer components. TPVs are also blends of thermoplastic and elastomer like TPOs, except that the dispersed elastomer component is crosslinked or vulcanized. As a result of the increased coherence of the dispersed, crosslinked elastomer, its share of the total composition in a TPV may be increased to levels higher than for a TPO.

Traditionally, highly amorphous, very low density ethylene-propylene copolymers (EPs) and ethylene-propylene-diene terpolymers (EPDMs) have been used as the elastomer component in STPBs. These EPs or EPDMs generally have a high viscosity expressed in Mooney units. STPBs desirably have the processing characteristics of the thermoplastic phase, while the ultimate properties include a substantial amount of elasticity from the rubber phase.

A major market for STPBs is in the manufacture of automotive parts, especially bumper fascia, door skin, air bag cover, side pillars and the like. These parts are generally made using an injection molding process. To increase efficiency and reduce costs it is necessary to decrease molding times and reduce wall thickness in the molds. To accomplish these goals, manufacturers have turned to high melt flow rate polypropylenes, (e.g. greater than 35 g/10 min). These high melt flow rate resins are low in molecular weight and consequently difficult to toughen, resulting in products that have low impact strength as previously mentioned. It would be desirable to formulate an STPB having greater elongation to break and more toughness, improved processability, and/or a combination thereof.

US 2007/0240605 describes low molecular weight propylene copolymers. Polyolefin thermoplastic elastomers comprising blends of propylene polymers with non-crystalline ethylene-α-olefin random copolymers or with hydrogenated products of styrene-butadiene-styrene block copolymers are disclosed in Japanese laid-open patent application Nos. Sho 50-14742/1975, Sho 52-65551/1977, Sho 58-20664/1983, and Sho 58-215446/1983.

SUMMARY OF THE INVENTION

According to the present invention, thermoplastic olefins (TPO), impact copolymers (ICP) and thermoplastic vulcanizates (TPV), collectively referred to herein as soft thermoplastic blends (STPBs), blended with certain low molecular weight polymer materials incorporating propylene-dominated copolymer components (PDC's), provide polymeric compositions with improved physical and/or processing properties, e.g. improved fluidity at processing temperature and/or improved toughness in the ultimate product.

The improved processability of the composition relates to the ease with which an STPB, usually difficult to extrude, can be extruded at high line speeds, assisted by a desirable melt flow rate. More specifically, in certain embodiments, the polymeric compositions provide additional control of processability without significantly detracting from underlying toughness characteristics. Most importantly, in blends with STPB compositions the PDC polymers are able to form tough, easily processable compositions, whereas similar blends of the same STPB composition without the PDC are not easily processed; or where a high melt flow rate polypropylene is used to improve processability in the absence of the PDC, the STPB composition has poor physical properties such as reduced toughness.

This invention relates to a polymeric composition having a melt flow rate of at least 1 g/10 min and a flexural modulus less than 100 MPa, comprising:

(i) from about 1 wt % to about 99 wt %, based on the total weight of hydrocarbons in the polymeric composition, of a propylene-dominated copolymer component (referred to as PDC) comprising at least one propylene copolymer comprising from 99.9 wt % to 65 wt % propylene and 0.1 wt % to 35 wt % comonomer (based upon the weight of the copolymer), wherein the propylene copolymer has a melt flow rate from 250 to 7500 g/10 min, a heat of fusion between 0.5 and 40 J/g, and an mm triad tacticity index of at least 75%; and (ii) blended therewith, from about 99 wt % to about 1 wt %, based on the total weight of hydrocarbons in the polymeric composition, of a soft thermoplastic blend (STPB) comprising an isotactic polypropylene thermoplastic phase and a high molecular weight (greater than 100,000 Mw) or crosslinked elastomeric phase.

DETAILED DESCRIPTION OF THE INVENTION

Definitions

As used herein: Mw is weight average molecular weight, Mn is number average molecular weight, and Mz is z average molecular weight. MFR is melt flow rate (as measured by ASTM 1238 at 230° C. and 2.16 kg, units are g/10 min). Hf is heat of fusion. An annealed heat of fusion is an Hf measured after the sample has been annealed for 5 minutes at 100° C. Wt % is weight percent. DSC is differential scanning calorimetry and DMTA is dynamic mechanical thermal analysis. Tm is the peak melting point of the composition in ° C. as determined by DSC. T½ is the half life of crystallization in minutes at the specified temperature in ° C. as determined by DSC. Tc is peak crystallization temperature as determined by DSC. Tg is the glass transition temperature of the composition in ° C. as determined by DMTA. $^{13}$C NMR is carbon-13 nuclear magnetic resonance. Shore A hardness is measured instantaneously according to ASTM D 2240. Tensile strength and Ultimate Elongation are measured according to ASTM D790 on type 3 samples deformed at a rate of 20 inches (50.8 cm)/minute. Tensile strength is reported in MPa and Ultimate Elongation in %. 300% modulus is the tensile strength of the sample at an elongation of 300%. 500% modulus is the tensile strength of the sample at an elongation of 500%.

"Easily moldable" means simultaneously (1) an MFR greater than 1 g/10 min, preferably an MFR greater than 5 g/10 min, preferably an MFR greater than 10 g/10 min, preferably greater than 30 g/10 min, preferably greater than 50 g/10 min and most preferably greater than 80 g/10 min; and (2) a crystallization temperature (Tc) greater than 60° C., preferably greater than 75° C. and even more preferably greater than 90° C. The blends described herein are easily moldable.

When a polymer or oligomer is referred to as comprising an olefin, the olefin present in the polymer or oligomer is the polymerized or oligomerized form of the olefin. An oligomer is defined to be compositions having 2-120 monomer units. A polymer is defined to be compositions having 121 or more monomer units. For the purpose of this invention, copolymers will be used to define polymers from two or more monomers, and polymers can have repeat units from one or more different monomers.

Unless otherwise noted, all molecular weight units (e.g., Mw, Mn, Mz) are g/mol and all ppm's are wt ppm. Unless otherwise noted all melting points ($T_m$) for the PDC is from the first melt and for all of the other polymers and their blends described in this invention, from the second melt. Hf is determined using the area integrated under the melting $T_m$ curve.

This invention relates to (1) a low molecular weight (Mw of less than 100,000 g/mol) propylene dominated copolymer (PDC) having a low crystallinity (Tm less than 50° C.) at modest levels (15 mole % or less) of α-olefin used to prepare and process polymer compositions, and (2) polymeric compositions comprising a blend of the PDC with a soft thermoplastic blend (STPB). In one embodiment, the blend composition can be improved in tensile properties such as ductility, elongation and toughness and in another embodiment, a toughened, high flow blend having an MFR greater than that of the STPB alone is provided, or in a particular embodiment the blend is both improved in tensile properties such as ductility, elongation and toughness properties and has higher flow, compared to the STPB, in processing characteristics.

By heterogeneous blend is meant a composition where one polymer forms discrete packets dispersed in a matrix of another polymer. Also heterogeneous blend is defined to include co-continuous blends where the blend components are separately visible, but it is unclear which is the continuous phase and which is the discontinuous phase. Such morphology is determined using scanning electron microscopy (SEM) or atomic force microscopy (AFM), in the event the SEM and AFM provide different data, then the SEM shall be used.

Soft Thermoplastic Polymer Blend (STPB)

The term Soft Thermoplastic Polymer Blend (STPB) is defined to mean a multiphase polymer blend where a thermoplastic, preferably isotactic polypropylene, forms a continuous matrix phase and an elastomer, such as an ethylene containing interpolymer, forms a dispersed phase. Thermoplastic is defined to mean a polymer having a melting point above 100° C., preferably above 140° C., preferably above 160° C. Elastomer is defined to mean a polymer having crystallinity less than 25 J/g with a melting point of 65° C. or less. Preferred elastomers have a crystallinity less than 15 J/g with a melting point of 50° C. or less and a Tg of less than −30° C.

A preferred soft thermoplastic blend (STPB) is a heterogeneous blend of: 1) isotactic polypropylene having a melting point of at least 100° C. and 2) an elastomer where the isotactic polypropylene forms the continuous phase and the elastomer forms the discontinuous phase. The elastomer may be: 1) uncrosslinked or unvulcanized, 2) partially cross linked or partially vulcanized, or 3) completely crosslinked or completely vulcanized. In any STPB, if the elastomer is not crosslinked or vulcanized, it is preferred that the elastomer have an Mw of 30,000 or more. If the elastomer is partially or completely crosslinked or vulcanized, then the elastomer may have an Mw of 30,000 or more (prior to crosslinking or vulcanization). Elastomer Mw is determined by GPC.

The polypropylene matrix imparts tensile strength and chemical resistance to the STPB, while the elastomers polymer imparts flexibility and impact resistance. Some classes of STPB's (referred to as TPV's) contain fully or partially crosslinked elastomer as the dispersed phase, while others, such as TPOs and ICPs, have a dispersed phase which is not crosslinked, or are only modestly crosslinked. TPOs are typically made by mechanical and post polymerization blending of the components while ICPs are typically made during the polymerization by differential polymerization of the polymer components. TPVs are also blends of thermoplastic and elastomer like TPOs, except that the dispersed elastomer component is crosslinked or vulcanized. As a result of the increased coherence of the dispersed, cross linked elastomer, its share of the total composition in a TPV may be increased to levels higher than for a TPO.

In one embodiment the thermoplastic phase comprises polypropylene, e.g. isotactic polypropylene, or a propylene-alpha-olefin copolymer, wherein the propylene homopolymer or copolymer has a melting point greater than about 110° C., or greater than 120° C. As one example, the propylene copolymer can comprise a random copolymer of propylene, wherein the percentage of the copolymerized ethylene or higher alpha-olefin in the copolymer is between a lower limit of 0.5% or 2% and an upper limit of 9%, by weight of the copolymer. Such propylene copolymers are typically known in the art as random copolymers (RCPs).

In one embodiment, the elastomeric phase of the STPB component can be selected from the group consisting of natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), Styrene butadiene hydrogenated or styrene isoprene hydrogenated rubbers such as SEBS and SEPS, ethylene-propylene rubber (EPM), ethylene-propylene-diene rubber (EPDM), ethylene plastomers, polysulfide, nitrile rubber, propylene oxide polymers, star-branched butyl rubber, halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), and mixtures thereof.

In an embodiment, the elastomeric phase of the soft thermoplastic blend component is vulcanized.

In one embodiment, the STPB component comprises an inherently heterogeneous blend of isotactic polypropylene or isotactic RCP with an elastomer. As used herein, the terms elastomer and rubber are considered to be synonymous. The elastomer is dispersed within the thermoplastic phase in particles of less than 10 μm in average (mean) diameter, preferably 5 μm or less, preferably 2 μm or less. Such blends are commonly known in the art as thermoplastic olefins (TPO), impact copolymer (ICP) and thermoplastic vulcanizates (TPV). Several useful STPB's are commercially available under the trade designations SANTOPRENE™, UNIPRENE™, NEXPRENE™ and VEGAPRENE™, which are examples of TPVs, and SOFTELL™, ADFLEX™ and CATALLOY™, which are examples of TPOs. Commercially available TPVs and TPOs may also contain additives such as curatives, flow improvers, nucleators and antioxidants which are normally added to isotactic polypropylene and/or elastomer to improve or retain properties.

In one embodiment the elastomer comprises an ethylene plastomer, which is a random copolymer of ethylene and another alpha-olefin having from 3 to 8 carbon atoms (typically prepared with a single-site metallocene catalyst), having a Tg below −50° C. and a density from 0.86 to 0.91 g/cm$^3$. Plastomers are available commercially under the trade designation EXACT™ (ExxonMobil Chemical Co.) and ENGAGE™ (Dow Chemical Co.) for example.

In one embodiment, the thermoplastic phase of the STPB includes predominantly crystalline polypropylene, i.e., it has a melting point generally greater than about 110° C., preferably greater than about 115° C., and most preferably greater than about 130° C.

In a further embodiment, the thermoplastic phase of the STPB can include polypropylene that can vary widely in composition. For example, the propylene copolymer can contain another monomer in an amount equal to or less than about 10 wt % of the copolymer, i.e., at least about 90 wt % propylene can be present in the copolymer. The thermoplastic phase of the STPB may be a combination of homopolypropylene, and/or random, and/or block propylene copolymers. When the thermoplastic phase of the STPB is a random propylene copolymer, the percentage of the copolymerized α-olefin in the copolymer is, in general, from about 0.5 to about 9, preferably about 2 to about 8, and most preferably about 2 to about 6 wt % of the copolymer. The preferred α-olefins contain 2 or from 4 to about 12 carbon atoms. The most preferred α-olefin is ethylene. One, two or more α-olefins can be copolymerized with propylene in the copolymer.

In embodiments, the MFR of the STPB is less than 200 g/10 min, less than 150 g/10 min, less than 100 g/10 min, less than 75 g/10 min, less than 50 g/10 min, less than 35 g/10 min, less than 30 g/10 min, less than 20 g/10 min or preferably less than 10 g/10 min or less than 5 g/10 min or less than 3 g/10 min or less than 2 g/10 min. Alternately the MFR of the STPB is preferably greater than 0.05 g/10 min, greater than 0.1 g/10 min, or greater than 0.5 g/10 min.

STPBs useful herein preferably have an elongation at break of at least 50% and a tensile strength of at least 6 MPa measured according to ASTM D412. Preferred STPBs have a Shore A hardness (5-sec value) between about 23 to about 87, measured according to ASTM D2240.

Often commercial STPB's are sold as blends with process oils, such as hydrocarbon fluids. For purposes of this invention, any such blend is considered a STPB component diluted with a process oil which is a plasticizer.

Dynamically Vulcanized Alloys (DVA)

Preferred STPB's include DVA's (Dynamically Vulcanized Alloys). The term DVA used herein means a mixture ranging from small particles of crosslinked rubber well dispersed in a semi-crystalline polypropylene matrix to co-continuous phases of the semi-crystalline polypropylene and a partially to fully crosslinked rubber or combinations thereof. The term "thermoplastic vulcanizate" indicates the rubber phase is at least partially vulcanized (crosslinked). The term DVA also refers to compositions that may possess the properties of a thermoset elastomer and are reprocessable in an internal mixer. Upon reaching temperatures above the softening point or melting point of the semi-crystalline polypropylene phase, they can form continuous sheets and/or molded articles with what visually appears to be complete knitting or fusion of the thermoplastic vulcanizate under conventional molding or shaping conditions for thermoplastics.

Subsequent to dynamic vulcanization (curing) of the rubber phase of the thermoplastic vulcanizate, desirably less than 20 or 50 wt % of the curable rubber is extractable from the specimen of the thermoplastic vulcanizate in boiling xylene. Techniques for determining extractable rubber as set forth in U.S. Pat. No. 4,311,628, are herein incorporated by reference.

The conventional semi-crystalline polypropylene used in DVA's comprises semi-crystalline thermoplastic polymers from the polymerization of monoolefin monomers (e.g. 2 to 10 carbon atoms) by a high pressure, low pressure, or intermediate pressure process; or by Ziegler-Natta catalysts, or by metallocene catalysts. It may have any tacticity (e.g. isotactic and syndiotactic) or be a copolymer such as impact modified polypropylene. Desirably the monoolefin monomers converted to repeat units are at least 80, 85 or 93 percent propylene. The polypropylene can be a homopolymer, a reactor copolymer, isotactic polypropylene, syndiotactic polypropylene, impact copolymer polypropylene, and other prior art propylene copolymers. Desirably the thermoplastic polymer has a melting temperature peak of at least 120° C. and a heat of fusion of greater than 75, 80, or 90 J/g.

In a preferred embodiment, the rubber used in the DVA (or in the blends of this invention) can be any rubber that can react and be crosslinked under crosslinking conditions. These rubbers include natural rubber, EPDM rubber, butyl rubber, halobutyl rubber, halogenated (e.g. brominated) copolymers of p-alkylstyrene and an isomonoolefin having from 4 to 7 carbon atoms (e.g. isobutylene), butyl rubbers containing repeat units from divinyl benzene, homo or copolymers from at least one conjugated diene, or combinations thereof. EPDM, butyl and halobutyl rubbers are referred to as rubbers low in residual unsaturation and are preferred when the vulcanizate needs good thermal stability or oxidative stability. The rubbers low in residual unsaturation desirably have less than 10 wt % repeat units having unsaturation. Desirably excluded from rubbers are acrylate rubber and epichlorohydrin rubber.

In another embodiment, the rubber used in the DVA (or in the blends of this invention) is desirably an olefin rubber such as EPDM-type rubber. EPDM-type rubbers are generally terpolymers derived from the polymerization of at least two different monoolefin monomers having from 2 to 10 carbon atoms, preferably 2 to 4 carbon atoms, and at least one poly-unsaturated olefin having from 5 to 20 carbon atoms. Said monoolefins desirably have the formula $CH_2$=CH—R where R is H or an alkyl of 1-12 carbon atoms and are preferably ethylene and propylene. Desirably the repeat units from at least two monoolefins (and preferably from ethylene and propylene) are present in the polymer in weight ratios of 25:75 to 75:25 (ethylene:propylene) and constitute from about 90 to about 99.6 wt % of the polymer. The polyunsaturated olefin can be a straight chained, branched, cyclic, bridged ring, bicyclic, fused ring bicyclic compound etc., and preferably is a nonconjugated diene. Desirably repeat units from the nonconjugated polyunsaturated olefin is from about 0.4 to about 10 wt % of the rubber.

The rubber used in the DVA can be a butyl rubber, halobutyl rubber, or a halogenated (e.g. brominated) copolymer of p-alkylstyrene and an isomonoolefin of 4 to 7 carbon atoms. "Butyl rubber" is defined a polymer predominantly comprised of repeat units from isobutylene but including a few repeat units of a monomer which provides sites for crosslinking. The monomers which provide sites for crosslinking, can be a polyunsaturated monomer such as a conjugated diene or divinyl benzene. Desirably from about 90 to about 99.5 wt % of the butyl rubber are repeat units derived from the polymerization of iso-butylene, and from about 0.5 to about 10 wt % of the repeat units are front at least one polyunsaturated monomer having from 4 to 19 carbon atoms. Preferably the polyunsaturated monomer is isoprene or divinylbenzene. The polymer may be halogenated to further enhance reactivity in crosslinking. Preferably the halogen is present in amounts from about 0.1 to about 10 wt %, more preferably about 0.5 to about 3.0 wt % based upon the weight of the halogenated polymer; preferably the halogen is chlorine or bromine. The brominated copolymer of p-alkylstyrene, having from about 9 to 12 carbon atoms, and an isomonoolefin, having from 4 to 7 carbon atoms, desirably has from about 88 to about 99 wt % isomonoolefin, more desirably from about 92 to about 98 wt %, and from about 1 to about 12 wt % p-alkylstyrene, more desirably from about 2 to about 8 wt % based upon the weight of the copolymer before halogenation. Desirably the alkylstyrene is p-methylstyrene and the isomonoolefin is isobutylene. Desirably the percent bromine is from about 0.2 to about 8, more desirably from about 0.2 to about 3 wt % based on the weight of the halogenated copolymer. The copolymer is a complementary amount, i.e., from about 92 to about 99.8, more desirably from about 97 to about 99.8 wt %. These polymers are commercially available from ExxonMobil Chemical Co.

Other rubber such as natural rubber or synthetic homo or copolymers from at least one conjugated diene can be used. These rubbers are higher in unsaturation than EPDM rubber and butyl rubber. The natural rubber and said homo or copolymers of a diene can optionally be partially hydrogenated to increase thermal and oxidative stability. The synthetic rubber can be nonpolar or polar depending on the comonomers. Desirably the homo or copolymers of a diene have at least 50 wt % repeat units from at least one conjugated diene monomer having from 4 to 8 carbon atoms. Comonomers may be used and include vinyl aromatic monomer(s) having from 8 to 12 carbon atoms and acrylonitrile or alkyl-substituted acrylonitrile monomer(s) having from 3 to 8 carbon atoms. Other comonomers desirably used include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers may be used, and examples of these include maleated EPDM, and epoxy-functionalized natural rubbers. These materials are commercially available.

The thermoplastic vulcanizate can include a variety of additives. The additives include particulate fillers such as carbon black, silica, titanium dioxide, colored pigments, clay; zinc oxide; stearic acid; stabilizers; anti-degradants; flame retardants; processing aids; adhesives; tackifiers; plasticizers; wax; discontinuous fibers (such as world cellulose fibers) and extender oils. When extender oil is used it can be present in amounts from about 5 to about 300 parts by weight per 100 parts by weight of the blend of semi-crystalline polypropylene and rubber. The amount of extender oil (e.g., hydrocarbon oils and ester plasticizers) may also be expressed as from about 30 to 250 parts, and more desirably from about 70 to 200 parts by weight per 100 parts by weight of said rubber. When non-black fillers are used, it is desirable to include a coupling agent to compatibilize the interface between the non-black fillers and polymers. Desirable amounts of carbon black, when present, are from about 5 to about 250 parts by weight per 100 parts by weight of rubber.

Another component to the dynamic vulcanizate is the curative which crosslinks or vulcanizes the crosslinkable rubber phase. The type of curative used in this disclosure depends on the type of rubber to be crosslinked. The curatives for each type of rubber are conventional for those rubbers in thermoplastic vulcanizates and are used in conventional amounts. The curatives include, but are not limited to, phenolic resin curatives, sulfur curatives, with or without accelerators, accelerators alone, peroxide curatives, hydrosilation curatives using silicon hydride and platinum or peroxide catalyst, etc.

Thermoplastic vulcanizate compositions of the invention are useful for making a variety of articles such as tires, hoses, belts, gaskets, moldings and molded parts. They are particularly useful for making articles by extrusion, injection molding, blow molding, and compression molding techniques. They also are useful for modifying thermoplastic resins and in particular polyolefin resins. The compositions can be blended with thermoplastic resins using conventional mixing making a rubber modified thermoplastic resin. The properties of the modified thermoplastic resin depend upon the amount of thermoplastic vulcanizate composition blended.

The DVAs are generally prepared by melt-mixing in any order, the semi-crystalline polyolefin(s) (e.g. polypropylene thermoplastic), the random propylene copolymer, the rubber, and other ingredients (filler, plasticizer, lubricant, stabilizer, etc.) in a mixer heated to above the melting temperature of the polypropylene thermoplastic. The optional fillers, plasticizers, additives etc., can be added at this stage or later. After sufficient molten-state mixing to form a well mixed blend, vulcanizing agents (also known as curatives or crosslinkers) are generally added. In some embodiments it is preferred to add the vulcanizing agent in solution with a liquid, for example rubber processing oil, or in a masterbatch which is compatible with the other components. It is convenient to follow the progress of vulcanization by monitoring mixing torque or mixing energy requirements during mixing. The mixing torque or mixing energy curve generally goes through a maximum after which mixing can be continued somewhat longer to improve the fabricability of the blend. If desired, one can add some of the ingredients after the dynamic vulcanization is complete. Crosslinking (vulcanization) of the rubber can occur in a few minutes or less depending on the mix temperature, shear rate, and activators present for the curative. Suitable curing temperatures include from about 120° C. or 150° C. to about 250° C., more preferred temperatures are from about 150° C. or 170° C. to about 425° C. or 250° C. The mixing equipment can include Banbury® mixers, Brabender® mixers, multiroll mills and certain mixing extruders.

Thermoplastic Olefins (TPO)

Thermoplastic Olefins useful herein are commercially sold by the following with the accompanying trade names: A. Schulman Inc. as product name Invision™ and Polytrope®; ACI Plastics as product name Impact®; ACLO Compounders Inc. as product name ACCUTECH™; Advanced Composites as product name TPO products such as ATX781; API SpA as product name apigo®; DSM as product name Sarlink; Elastron Kimya as product name Elastron® TPO; Equistar Chemicals as product name Flexathene; ExxonMobil as product name Santoprene, Vistaflex; Ferro as product name Ferroflex, FerroPak, Duragrip; Formosa Plastics Corporation, U.S.A. as product name Formolene®; Geo-Tech Polymers as product name Geo-Tech; HiTech Polymers, Inc. as product name HTP; Japan Polyolefins Co., Ltd. JPO as product name OLEFLEX; KW Plastics as product name KW Plastics; Layergne Group as product name VYFLEX; LG Chemical as product name Keyflex; Lucobit AG as product name Lucobit; Lyondell Basell Industries as product name Adflex, Hifax, Hostacom, Pro-fax, Softell, Multibase; A Dow Corning Company as product name Multi-Flex® TPO; Mytex as product name grades such as AN110K-01, Noble Polymers as product name Ecobarrier™ and Rigid TPO, PolyOne as product name Elastamax TPO and OnFlex-V TPV; Prime Polymer Co., Ltd. as product name PRIME TPO; QTR, Inc. as product name QR Resin; RTP Co. as product name PermaStat; S&E Specialty Polymers, LLC as product name GPE™, GPP™, GTPO™, GXL; Salflex Polymers Ltd. as product name Salflex TPV; Solvay Engineered Polymers as product name DEXFLEX®, Dexpro, INDURE™, SEQUEL®; Spartech as product name TPO/TPE products such as SP-3810 and Spartech Polycom; Teknor Apex as product name Telcar; Vi-Chem Corporation as product name Ethavin; and Washington Penn as product name grades such as WPP TPO, TPO-125.

IMPACT Copolymers

Examples of Impact copolymer grades include Basell Polyolefins Pro-fax™ SD242, Phillips Petroleum Sumika's Marlex™ AGM-010, AMN-010, ALN-230, Huntsman's 14SO$_5$A, 36SO$_4$A, 18SO$_7$A, and Formosa Formolene™ 2306N, 2610A.

Propylene Dominated Component (PDC)

A propylene dominated copolymer (PDC) is a copolymer having at least 65 wt % propylene at least 0.1 mole % of at least one other comonomer.

In a preferred embodiment, the propylene copolymer of the PDC comprises 0.1 wt % to 35 wt % (preferably 5 wt % to 25 wt %, preferably 8 wt % to 20 wt %, more preferably 10 wt % to 20 wt %) of one or more comonomers selected from the group consisting of ethylene and C4 to C20 olefins, preferably ethylene, butene, hexene, octene, decene, and dodecene, more preferably ethylene butene and hexene, preferably ethylene). The propylene copolymer may also include from about 0.5 wt % to about 3 wt % diene (based upon the weight of the copolymer). In a preferred embodiment the comonomer comprises ethylene and one or more of butene, hexene and octene.

The PDC component may comprise one, two, three or more different propylene copolymers (by different is meant that the copolymers differ in comonomer choice) or in at least one of Mw, Mz, Mn, $T_m$, comonomer content, Hf, Mw/Mn, 2,1 insertions, 3,1 insertions, tensile modulus by at least 10%, preferably at least 40%, preferably at least 100% and preferably at least 500%.

Preferably, the propylene copolymer (or blend of propylene copolymers that make up the PDC) has: (1) a melting point between 25° C. and 110° C.; and/or (2) a heat of fusion from 1.0 to 125 J/g; and/or (3) a propylene tacticity index (m/r) from 4 to 12; and/or (4) a reactivity ratio product $r_1 r_2$ of less than 1.5; and/or (5) a molecular weight distribution (Mw/Mn) between 1.5 and 40, and/or (6) an elasticity in % equal to or less than 0.935M+12 where M is the 500% tensile modulus in MPa and is at least 0.5 MPa; and/or (7) a proportion of inversely inserted propylene units greater than 0.5%, based on 2,1 insertion of propylene monomer in all propylene insertions; and/or (8) a proportion of inversely inserted propylene units greater than 0.05%, based on 1,3 insertion of propylene monomer in all propylene insertions; and/or (9) less than 10,000 ppm by weight of the copolymer of a molecular degradation agent (such as peroxide) or its reaction products.

Preferred propylene copolymers are typically made in one or more steady-state reactors in the presence of a bridged metallocene catalyst.

In an embodiment the PDC comprises a low molecular weight (MFR of 250-7500 dg/min) propylene α-olefin copolymer for blending with styrene block polymers which has some or all of the following features: (1) a Tm (as measured by the DSC method in the Example section below) between an upper limit of less than 110° C., 90° C., 80° C., or 70° C., and a lower limit of greater than 25° C., 35° C., 40° C., or 45° C.; (2) an mm triad tacticity index as determined by $^{13}$C NMR of greater than 75%, 80%, 85%, or 90%; (3) a relationship of elasticity to 500% tensile modulus such that elasticity in % is less than or equal to 0.935M+12, 0.935M+6, or 0.935M, where M is the 500% tensile modulus in MPa (where elasticity and 500% tensile modulus are determined according ASTM D 638, modified as noted in Example section below); (4) a heat of fusion ranging from a lower limit of greater than 1.0, 1.5, 4.0, 6.0, or 7:0 joules per gram (J/g), to an upper limit of less than 125, 100, 75, 60, 50, 40, or 30 J/g (as measured by the DSC method in the Example section below); (5) a propylene tacticity index (m/r) ranging from a lower limit of 4 or 6 to an upper limit of 8, 10 or 12; (6) a proportion of inversely inserted propylene units based on 2,1 insertion of propylene monomer in all propylene insertions, as measured by $^{13}$C NMR (determined according to the procedure in U.S. Pat. No. 5,504,172), of greater than 0.5% or 0.6%; (7) a proportion of inversely inserted propylene units based on 1,3 insertion of propylene monomer in all propylene insertions, as measured by $^{13}$C NMR, of greater than 0.05%, 0.06%, 0.07%, 0.08%, or 0.085%, (determined according to the procedure described in U.S. Pat. No. 5,504,172), which describes this βγ peak and understands it to represent a sequence of four methylene units; (8) a reactivity ratio product $r_1 r_2$ (as described in *Textbook of Polymer Chemistry*, F. W. Billmeyer, Jr., Interscience Publishers, New York, p. 221 et seq. (1957)) of less than 1.5, 1.3, 1.0 or 0.8; (9) an Mw/Mn ranging from a lower limit of 1.5 or 1.8 to an upper limit of 40, 20, 10, 5 or 3; Mw, Mn and Mz are determined according to Sun et al., *Macromolecules*, vol. 34, no. 19, pp. 6812-6820 (2001)1. (10) an MFR of greater than 250, 300, 400, 500, 600, 750, 1000, 1300, 1600, or 2000 and less than 7500, 6500, 5500, 4500, 3000 or 2500; (11) a 500% tensile modulus of greater than 0.5, 0.8, 1.0, or 2.0 MPa (determined according ASTM D 638, modified as noted in Example section below); (12) an Hf of less than 40, 35, 25, 20, 15, 10, 6, or 3 J/g and more than 0.5, 1 or 2 J/g (determined according to DSC method in the example section below); (13) the copolymer contains less than 10,000, 5000, 3000, 2000, 1000, 500, or 250 ppm by weight of the copolymer of a molecular degradation agent or its reaction products; and/or (14) the copolymer is made by reacting a mixture of monomers including α-olefins and propylene in one or more steady-state reactors under reactive conditions in the presence of a bridged metallocene catalyst.

The mm triad tacticity index (mm fraction) of a propylene copolymer can be determined from a $^{13}$C NMR spectrum of the propylene copolymer as described in U.S. Pat. No. 5,504,172). The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum can be assigned with reference to *Polymer*, Volume 30, page 1350 (1989). The calculation of the triad tacticity index is outlined in the techniques shown in U.S. Pat. No. 5,504,172 and in US 2006/0247331 (page 18, paragraph [239]-[240]). The propylene copolymers useful herein typically have an mm triad tacticity index of three propylene units, as measured by $^{13}$C NMR, of greater than 75%, 80%, 82%, 85%, or 90%.

Propylene tacticity index (m/r) is determined using $^{13}$C NMR as described at US 2006/0247331, page 18, paragraph [237].

The insertion of propylene can occur to a small extent by either 2,1 (tail to tail) or 1,3 insertions (end to end), as known in the art. The proportion of the 2,1-insertions to all of the propylene insertions in a propylene copolymer can be calculated by reference to article in the journal *Polymer*, vol. 30, p. 1350 (1989), using the peak-naming method of Carman, et al., *Rubber Chemistry and Technology*, vol. 44, p. 781 (1971), also see K. Soga, *Macromolecular Chemistry Rapid Communication*, vol. 8, p. 305 (1987), and where necessary to separate the peak areas of the Iαβ structures, substituting carbon peaks having the corresponding areas as is known in the art.

The measurement of the 1,3 insertion requires the measurement of the βγ peak. Two structures can contribute to the βγ peak: (1) a 1,3 insertion of a propylene monomer; and (2) from a 2,1-insertion of a propylene monomer followed by two ethylene monomers. This peak is described as the 1,3 insertion peak and we use the procedure described in U.S. Pat. No. 5,504,172, which describes this βγ peak and understand it to represent a sequence of four methylene units. The proportion (%) of the amount of these errors was determined by dividing the area of the βγ peak (resonance in the vicinity of 27.4 ppm) by the sum of all the methyl group peaks and ½ of the area of the β γ peak, and then multiplying the resulting value by 100. If an α-olefin of three or more carbon atoms is polymerized using an olefin polymerization catalyst, a number of inversely inserted monomer units are present in the molecules of the resultant olefin polymer. In polyolefins prepared by polymerization of α-olefins of three or more carbon atoms in the presence of a chiral metallocene catalyst, 2,1-insertion or 1,3-insertion takes place in addition to the usual 1,2-insertion, such that inversely inserted units such as a 2,1-insertion or a 1,3-insertion are formed in the olefin polymer molecule (see, *Macromolecular Chemistry Rapid Communication*, Volume 8, page 305 (1987), by K. Soga, T. Shiono, S. Takemura and W. Kaminski).

The PDC component of the polymer blend compositions of the present invention preferably comprises a crystallizable copolymer of propylene and ethylene and, optionally, another α-olefin. A crystallizable polymer, distinct from a crystalline polymer, is defined herein as a polymeric component where the measured crystallinity of the polymer as measured by the heat of fusion by DSC is augmented after conditioning by a factor of at least 1.5, or at least 2. Conditioning for crystallizable polymer determination can include (1) waiting for a period of 120 hours at room temperature, or (2) single or repeated mechanical distension of the sample.

The PDC can include total propylene-derived units from a lower limit of 65 or 70% by weight of the PDC to an upper limit of 95, 94, 92, or 90% by weight of the PDC, and ethylene and other α-olefin-derived units from a lower limit of 5, 6, 8, or 10% by weight of the PDC to an upper limit of 20, 25, 30 or 35% by weight of the PDC. Suitable α-olefins other than ethylene or propylene have from 4 to about 20 carbon atoms. These copolymers are mildly crystalline (less than 20%, preferably less than 10%) as determined by DSC, and are exceptionally soft, while still retaining substantial tensile strength and elasticity. (% crystallinity of a propylene polymer is determined by the following formula: % X=(Hf j/g)/(189 J/g)×100), where % X is % crystallinity, and Hf is the heat of fusion of the sample in question in J/g. The PDC useful in the present invention exhibits the softness, tensile strength and elasticity characteristic of vulcanized rubbers, without the need for vulcanization.

The PDC may in embodiments also include diene-derived units preferably in an amount greater than 0.1, 0.5 or 1% by weight of the PDC. Diolefins, preferably nonconjugated diolefins, may be incorporated in the PDC to facilitate chemical crosslinking reactions. Sources of diene can include diene added to the monomers in the polymerization, or use of diene in the polymerization catalysts. For example, conjugated diene-containing metallocene catalysts have been suggested for the formation of copolymers of olefins, and polymers made from such catalysts may incorporate the diene from the catalyst in the polymerization of other monomers.

The PDC of the present invention preferably comprises a random copolymer having a narrow crystallinity distribution. The intermolecular compositional distribution of the polymer can be determined by thermal fractionation of a sample of the PDC in excess solvent, typically a saturated hydrocarbon such as hexane or heptane at 50° C.

The length and distribution of stereoregular propylene (PP) sequences in the PDC propylene copolymer are consistent with substantially random statistical copolymerization. These are described more fully in *Textbook of Polymer Chemistry*, F. W. Billmeyer, Jr., Interscience Publishers, New York, p. 221 et seq. (1957). $^{13}$C NMR is used to determine diad and triad distribution via the integration of spectral peaks. A substantially random copolymer is one for which the reactivity ratio product $r_1 r_2$ is between 0.6 and 1.5. The PDC in embodiments herein has a reactivity ratio product $r_1 r_2$ of less than 1.5, 1.3, 1.0, or 0.8. To produce the PDC with the required randomness and narrow composition distribution, it is desirable to use a single site catalyst in a well-mixed, continuous flow stirred tank polymerization reactor which allows a uniform polymerization environment for growth of substantially all of the polymer chains.

The PDC preferably has stereoregular propylene sequences long enough to crystallize. These stereoregular propylene sequences may match the stereoregularity of the propylene sequences in another polypropylene blend component (e.g. the TPC). It is believed that matching of the stereoregularity increases the compatibility of the components and results in improved solubility and compatibility of the polymers of different crystallinities in the polymer blend.

Stereoregularity of the propylene sequences in the PDC can preferably be achieved by polymerization with a chiral metallocene catalyst, and more preferably in an embodiment where the polymerization catalyst forms essentially or substantially isotactic polypropylene. Measurements of the tacticity are determined by $^{13}$C NMR as described in US 2007/0244276A1. The PDC in various embodiments have a triad tacticity of greater than 75, 80, 82, 85, or 90% of the total propylene triad units.

As is well known, the insertion of propylene can occur to a small extent by either 2,1 (tail to tail) or 1,3 insertions (end to end). Measurements of the insertion geometry are determined by $^{13}$C NMR as described in US 2007/0244276A1. As measured by $^{13}$C NMR, the proportion of inversely inserted propylene units of embodiments of the present PC, based on the 2,1-insertion of propylene monomer, is greater than 0.5 or 0.6%; and based on the 1,3-insertion of propylene monomer, is greater than 0.05, 0.06, 0.07, 0.08, or 0.085%.

Homogeneous distribution is defined herein as a statistically insignificant intermolecular difference in both the monomer composition of the copolymer and the tacticity of the propylene units, i.e., a copolymer having a homogeneous distribution will meet the requirement of two independent tests: (1) intermolecular distribution of tacticity; and (2) intermolecular distribution of composition.

In preferred embodiments, the PDC has a single melting point as determined by DSC, between an upper limit of less than 110° C., 90° C., 80° C., or 70° C., and a lower limit of greater than 25° C., 35° C., 40° C., or 45° C. Generally, the PDC of the present invention has a melting point between about 90° C. and 20° C. Preferably, the melting point is between about 75° C. and 25° C. In embodiments, the PDC component also has a heat of fusion ranging from a lower limit of greater than 1.0, 1.5, 4.0, 6.0, or 7.0 J/g, to an upper limit of less than 125, 100, 75, 60, 50, 40 or 30 J/g. Without wishing to be bound by theory, we believe that embodiments of the PDC have generally isotactic crystallizable propylene sequences, and these heats of fusion are believed to be due to the melting of these crystalline segments.

Molecular weight distribution (MWD), sometimes also called the polydispersity index (PDI), is a measure of the range of molecular weights (Mw/Mn) within a given polymer sample. The MWD can be measured using gel permeation chromatography (GPC), also known as size exclusion chromatography (SEC), for example, using chromatograph equipped with ultrastyro gel columns operated at 145° C. with trichlorobenzene as the elution solvent according to procedures well known in the art. See for example, Slade, *Polymer Molecular Weights Part II*, Marcel Dekker, Inc., NY, 287-368 (1975); Rodriguez, *Principles of Polymer Systems* 3rd ed., Hemisphere Pub. Corp., NY, 155-160 (1989); U.S. Pat. No. 4,540,753; Verstrate, *Macromolecules*, vol. 21, 3360 (1988); and references cited therein.

In embodiments of the invention, the PDC can have Mw of from 10,000 to 500,000, or from 20,000 to 200,000, and an Mw/Mn from a lower limit of at least 1.5 or 1.8 to an upper limit of less than 40, 20, 10, 5 or 3.

In embodiments, the PDC can have an MFR (230° C., 2.16 kg) from a lower limit of greater than 250, 300, 400, 500, 600, 750, 1000, 1300, 1600, or 2000 dg/min, to an upper limit of less than 7500, 6500, 5500, 4500, 3000 or 2500 dg/min.

In embodiments, the PDC can have an elongation of greater than 500%, 600%, or 900%; and a tensile strength greater than 2.1, 3.5 or 6.9 MPa (300, 500 or 1000 psi). Tensile and elongation properties are determined at 51 cm/min (20 in/min) according to the procedure described in ASTM D790. The data are reported in engineering units with no correction to the stress for the lateral contraction in the specimen due to tensile elongation. The tensile and elongation properties of embodiments are evaluated using dumbbell-shaped samples which are compression molded at 180° C. to 200° C. for 15 minutes at a force of 133 kN (15 tons) into a plaque of dimensions of 15 cm by 15 cm (6 in. by 6 in.). The cooled plaques are removed and the specimens are removed with a die.

Preferably the polymeric blend compositions described herein are elastic after tensile deformation. The inverse of elasticity (or tension set) can be represented by the fractional increase in the length of the sample measured according to the general procedure of ASTM D790. During tensile elongation, the sample is stretched, and the polymer attempts to recover its original dimensions when the stretching force is removed. This recovery is not complete, and the final length of the relaxed sample is usually longer than that of the original sample. The inverse of elasticity (or tension set) is represented by the fractional increase in the length of the sample, expressed as a % of the length of the original un-stretched sample.

The tension set of a sample is determined by pre-stretching the deformable zone of the dumbbell, made according to the procedure described above for the measurement of elongation and tensile strength, which is the narrow portion of the specimen, to 200% of its original length to pre-stretch the sample. This is conducted at a deformation rate of 25 cm per minute (10 in./min). The sample is relaxed at the same rate to form an analytical specimen which is a pre-stretched specimen of the original sample. This slightly oriented, or pre-stretched, sample is allowed to relax for 48 hours, at room temperature, prior to the determination of elasticity. The length of the deformation zone in the sample $d_1$ is measured, and after the 48 hours, it is again deformed at 25 cm/min for a 200% extension of the deformation zone of the sample and allowed to relax at the same rate. The sample is removed and after 10 minutes of relaxation, the sample is measured to have a new length of the deformation zone $d_2$. The tension set of the sample in % is calculated as $100*(d_2-d_1)/d_1$.

In another embodiment, the PDC contains less than 10,000, 5000, 3000, 2000, 1000, 500 or 250 ppm by weight of the PDC of a molecular degradation agent or its reaction products. PDC's of the viscosities and the molecular weights disclosed herein are preferably made by polymerization directly to the desired viscosity and molecular weight rather than by molecular degradation of the higher viscosity, higher molecular PDC analogs using chain scission agents, e.g. peroxides at temperatures between 150° C. to 270° C.

Process to Make PDC

The propylene copolymers can be prepared in a single stage, steady state polymerization process conducted in a well-mixed continuous feed polymerization reactor. The polymerization can be conducted in solution, although other polymerization procedures such as gas phase or slurry polymerization, which fulfill the requirements of single stage polymerization and continuous feed reactors, are may also be used. The continuous, non-batch process, in steady state operation, is exemplified by removal of amounts of polymer made per unit time, being substantially equal to the amount of polymer withdrawn from the reaction vessel per unit time. By "substantially equal" we intend that these amounts, polymer made per unit time, and polymer withdrawn per unit time, are in ratios of one to other, of from 0.9:1; or 0.95:1; or 0.97:1; or 1:1.

The PDCs can be prepared by polymerizing a mixture of propylene and one or more other alpha olefins in the presence of a chiral catalyst (preferably a chiral metallocene), preferably wherein a copolymer is obtained comprising up to 35% by weight ethylene and/or higher alpha olefin and preferably up to 20% by weight ethylene and/or higher alpha olefin containing isotactically crystallizable propylene sequences, in a single stage or multiple stage reactor. Generally, without limiting in any way the scope of the invention, one process for the production of the PDC is as follows: (1) liquid propylene is introduced in a stirred-tank reactor which is completely or partly full of liquid comprising the solvent, the propylene copolymers as well as dissolved, unreacted monomer(s) and catalyst components, (2) the catalyst system is introduced via nozzles in either the vapor or liquid phase, (3) feed ethylene gas and any higher α-olefins are introduced either into the vapor phase of the reactor, or sparged into the liquid phase as is well known in the art, (4) the reactor contains a liquid phase composed substantially of propylene, together with dissolved ethylene and/or higher alpha olefin, and a vapor phase containing vapors of all monomers, (5) the reactor temperature and pressure may be controlled via reflux of vaporizing propylene (autorefrigeration), as well as by cooling coils, jackets, etc., (6) the polymerization rate is controlled by the concentration of catalyst, temperature, and (7) the ethylene and/or higher alpha olefin content of the polymer product is determined by the ratio of ethylene and/or higher alpha olefin to propylene in the reactor, which is controlled by manipulating the relative feed rates of these components to the reactor. According to another embodiment, the PDC may contain small quantities of a non-conjugated diene, which can be added to the reactor with the other monomer feeds.

A typical polymerization process consists of a polymerization in the presence of a catalyst comprising a chiral bis(cyclopentadienyl) group 4 metal compound and either: 1) a non-coordinating compatible anion activator or 2) an alumoxane activator. An exemplary catalyst system is described in U.S. Pat. No. 5,198,401. The alumoxane activator is preferably utilized in an amount to provide a molar aluminum to metallocene ratio of from about 1:1 to about 20,000:1 or more. The non-coordinating compatible anion activator is preferably utilized in an amount to provide a molar ratio of biscyclopentadienyl metal compound to non-coordinating anion of 10:1 to about 2:3. The above polymerization reaction is conducted by reacting such monomers in the presence of such catalyst system at a temperature of from about −50° C. to about 200° C. for a time of from about 1 second to about 10 hours to produce a copolymer or terpolymers having an MFR between 250 g/10 min and 7500 g/10 min and a Mw/Mn from greater than 1 to about 6, preferably from about 1.8 to about 4.5.

While the process of the present invention includes utilizing a catalyst system in the liquid phase, e.g. slurry, solution, suspension or bulk phase or combination thereof, gas phase polymerization can also be utilized. When utilized in a gas phase, slurry phase or suspension phase polymerization, the catalyst systems will preferably be supported catalyst systems as described in U.S. Pat. No. 5,057,475, for example, and can also include other well-known additives such as, for example, scavengers as described in U.S. Pat. No. 5,153,157.

Descriptions of useful ionic catalysts for polymerization herein including metallocene cations activated by non-coordinating anions appear U.S. Pat. Nos. 5,198,401 and 5,278,119, and WO 92/00333. These references suggest a method of preparation wherein metallocenes (bis Cp and mono Cp) are protonated by anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a non-coordinating anion are also useful herein. See, EP 0426637, EP 0573403 and U.S. Pat. No. 5,387,568. Reactive cations other than Bronsted acids capable of ionizing the metallocene compounds include ferrocenium, triphenylcarbonium, and triethylsilylium cations. Any metal or metalloid capable of forming a coordination complex which is resistant to degradation by water (or other Bronsted or Lewis acids) may be used or contained in the anion of the second activator compound. Suitable metals include, but are not limited to, aluminum, gold, platinum and the like. Suitable metalloids include, but are not limited to, boron, phosphorus, silicon and the like.

An additional method of making the ionic catalysts uses ionizing anionic pre-cursors which are initially neutral Lewis acids but form the cation and anion upon ionizing reaction with the metallocene compounds. For example tris (pentafluorophenyl) boron acts to abstract an alkyl, hydride or silyl ligand to yield a metallocene cation and stabilizing non-coordinating anion; see EP 0427697 and EP 0520732. Ionic catalysts useful herein for addition polymerization can also be prepared by oxidation of the metal centers of transition metal compounds by anionic precursors containing metallic oxidizing groups along with the anion groups; see EP 0495375. Catalyst combinations are described in US 2007/0244276A1.

According to another embodiment, the invention is directed to a process for preparing blend compositions comprising the steps of: (a) polymerizing a mixture of ethylene and propylene in the presence of a chiral metallocene catalyst to obtain a copolymer comprising from about 65% to about 95% propylene by weight of the copolymer having an mm triad tacticity index of at least 75% and an MFR greater than 250 dg/min; (b) polymerizing propylene or a mixture of propylene and one or more monomers selected from ethylene or $C_4$-$C_{20}$ α-olefins in the presence of a different polymerization catalyst to obtain a substantially isotactic propylene copolymer comprising from about 91% to about 99.5% propylene by weight of the isotactic propylene copolymer, a melting point by DSC greater than 65° C. or more preferably greater than 75° C. and an MFR greater than 5 dg/min; and (c) blending the propylene polymer of step (a) with the copolymer of step (b), and thereafter blending with the STPBC. In an embodiment, the propylene copolymer (or blend of propylene copolymer with the iPP) can include a plasticizer formed concurrently by the addition of a supplemental catalyst to polymerization step (a), step (b) or the combination thereof for the production of an atactic, amorphous polypropylene or copolymer of propylene and another α-olefin.

In another embodiment, the isotactic propylene copolymer from step (b) can have a maximum MFR less than 1500, less than 1000, less than 500, less than 200, less than 150, less than 100, less than 75, less than 50, less than 30, less than 20, or less than 10 dg/min.

Prochiral catalysts suitable for the preparation of crystalline and semi-crystalline isotactic polypropylene copolymers include those described in U.S. Pat. No. 5,145,819 and U.S. Pat. No. 5,304,614. Additionally, metallocenes such as those described in U.S. Pat. No. 5,510,502 (incorporated herein by reference) is suitable for use in this invention.

An embodiment of this invention generates a soft PDC suitable for blending with the tertiary polymer component which contains a lower amount of α-olefin to attain a lower heat of fusion than previously known for these low molecular weight or high MFR polymers. The PDC is thus crystallizable in contact with a crystalline polypropylene blend component. It is believed that the lower amount of comonomer in the PDC leads to improved redistribution of the PDC component into the other blend polymer components due to improved miscibility.

Tertiary Polymer Component (TPC)

The tertiary polymer component (TPC) is optionally present in the polymeric compositions of the present invention, and may be one polyolefin or a blend of polyolefins. In one embodiment the TPC is comprised of polypropylene, which can be a copolymer of propylene, a mixture of copolymers, or a combination of propylene homopolymers and copolymers. The TPC may also contain additives such as flow improvers, nucleators and antioxidants which are normally added to polypropylene to improve or retain properties.

In one embodiment, the TPC comprises polypropylene having a melting point greater than about 110° C., preferably greater than about 115° C., and most preferably greater than about 130° C. Preferably, the TPC has a heat of fusion greater than 75 J/g.

In a further embodiment, the TPC can include a polypropylene that can vary widely in composition. For example, the TPC propylene copolymer can contain another monomer in an amount equal to or less than about 10% by weight of the TPC, i.e., at least about 90% by weight propylene can be present in the TPC. The TPC may be a combination of homopolypropylene, and/or random, and/or block propylene copolymers as described herein. When the TPC is a random propylene copolymer, the amount of the copolymerized α-olefin in the copolymer is, in general, from about 0.5 wt % to about 9 wt %, preferably about 2 wt % to about 8 wt %, and most preferably about 2 wt % to about 6% wt %, based upon the weight of the TPC. The preferred α-olefins contain 2 or from 4 to about 12 carbon atoms. The most preferred α-olefin is ethylene. One, two or more α-olefins can be copolymerized with propylene in the TPC.

Exemplary α-olefins in the TPC copolymers may be selected from the group consisting of ethylene; butene-1; pentene-1; hexene-1; 2-methylpentene; 1,3-dimethylbutene; heptene-1; 3-methylhexene-1; methylethylbutene-1; 1,3-dimethylpentene; 1,4-dimethylpentene; 1,3,3-trimethylbutene-1; ethylpentene-1; octene-1; dimethylhexene-1; trimethylpentene-1; ethylhexene-1; methylethylpentene-1; diethylbutene-1; propylpentane-1; nonene-1; decene-1; methylnonene-1; dimethyloctene-1; trimethylheptene-1; ethyloctene-1; diethylhexene-1; dodecene-1; hexadodecene-1 and the like.

In a further embodiment, the MFR of the TPC is less than 200, 150, 100, 75, 50, 30, 20, 10, 5, 3, or 2 dg/min. Blends as described in embodiments can be made with an MFR in the TPC below any of these maximum MFR values.

In further embodiments, the TPC may comprise from about 1 wt % to about 95 wt % of the polymeric composition, preferably from about 20 wt % to about 70 wt %, and more preferably from about 25 wt % to about 60 wt %, based upon the weight of the polymeric composition.

There is no particular limitation on the method for preparing the TPC used in the polymeric compositions of the invention. However, in general, copolymers may be obtained by copolymerizing propylene and an α-olefin having 2 or from 4 to about 20 carbon atoms, preferably ethylene, in a single stage or multiple stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or batch process and may include use of chain transfer agents, scavengers, or other such additives as deemed applicable. Preferred propylene polymers useful herein as TPC's include Escorene™ PP3155 and PP1105 available from ExxonMobil Chemical Co. of Houston, Tex.

Plasticizer

In a further embodiment, a plasticizer can be optimally added to the polymer blend compositions of the present invention. "Plasticizer" refers to any or a variety of predominantly hydrocarbon molecules having an Mn of less than 20,000. The addition of plasticizer in moderate amounts may lower the viscosity and flexibility of the blend while improving the properties of the blend at temperatures near and below 0° C. It is believed that these potential benefits arise by the lowering of the Tg of the blend. Adding plasticizer to the blend may also improve processability and provide a better balance of elastic and tensile strength.

These plasticizers are typically known as extender oils or process oils in rubber applications. Process oils include hydrocarbons having either (a) traces of heteroatoms such as oxygen or (b) at least one hetero atom such as dioctyl phthalate, ethers, and polyethers. Process oils typically have a boiling point to be substantially involatile at 200° C. These process oils are commonly available either as neat solids, liquids, or as physically absorbed mixtures of these materials on an inert support, e.g., clay or silica, to form a free flowing powder. Process oils usually include a mixture of a large number of chemical compounds which may consist of linear, acyclic but branched, cyclic, and aromatic carbonaceous structures. Another family of process oils includes certain organic esters and alkyl ether esters having an Mn of less than 20,000. Combinations of process oils may also be used in the practice of the invention.

The process oil should be compatible or miscible with the polymer blend composition in the melt to form a homogenous one phase blend, and may be substantially miscible at room temperature. Process oils may be added to the blend compositions by any of the conventional means known in the art, including the addition of all or part of the process oil prior to recovery of the polymer, and addition of all or part of the process oil to the polymer as a part of a compounding for the interblending. The addition of process oils to lower the Tg of blends of isotactic polypropylene and ethylene propylene diene rubber is described in U.S. Pat. Nos. 5,290,886 and 5,397,832.

In a further embodiment the plasticizer can be a synthetic alkane lubricant such as a poly-α-olefin (PAO) comprising oligomers of linear olefins having 3 to 14 carbon atoms, more preferably 8 to 12 carbon atoms, more preferably 10 carbon atoms, and having a kinematic viscosity of 10 or more, as measured by ASTM D 445. Preferred PAO's have kinematic viscosities in the range of 0.1 to 3000 cSt at 100° C., preferably from 3 to 2000 cSt at 100° C., preferably 10 to 1000 cSt, and/or a pour point of 0° C. or less, preferably −20° C. or less and/or a flash point of 200° C. or more, preferably 220° C. or more, and/or a specific gravity of 0.86 or less, preferably 0.85 or less. Particularly preferred PAO plasticizers include those described at Page 16, line 14 to page 21, line 10 of WO 2004/014998.

In another embodiment the plasticizer may be a high Tg plasticizer (e.g. a Tg of 20° C. or more). The use of a high Tg plasticizer has a distinct effect on the properties of the blend in response to changes in temperature in such a way that it may be possible at room temperature to have blends which have a characteristic leathery feel in contrast to the formation of blends which have a rubbery feel when low Tg components are used as plasticizers.

In various embodiments, the compositions described herein may contain plasticizer in the range of from 0 to 500 parts by weight, or from 2 to 200 parts by weight, or from 5 to 150 parts by weight, or from 10 to 100 parts by weight, per hundred parts of total polymer by weight.

Various types of natural and synthetic resins (also referred to as tackifying resins), alone or in admixture with each other, can be blended with the polymeric compositions described herein, preferably at amounts of from 1 wt % to 70 wt %, preferably 5 wt % to 35 wt % based upon the weight of the blend. Suitable resins include, but are not limited to, natural rosins and rosin esters, hydrogenated rosins and hydrogenated rosin esters, coumarone-indene resins, petroleum resins, polyterpene resins, and terpene-phenolic resins. Specific examples of suitable petroleum resins include, but are not limited to aliphatic hydrocarbon resins, hydrogenated aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, and hydrogenated aromatic hydrocarbon resins. As used herein, "hydrogenated" includes fully, substantially and at least partially hydrogenated resins. Suitable aromatic resins include aromatic modified aliphatic resins, aromatic modified cycloaliphatic resin, and hydrogenated aromatic hydrocarbon resins. Any of the above resins may be grafted with an unsaturated ester or anhydride to provide enhanced properties to the resin.

Other Additives

While the above discussion has been limited to the description of the invention in relation to having only the PDC and STPB, and optionally the TPC and/or plasticizer and or natural and synthetic resins, those skilled in the art will appreciate that the polymer blend compositions of the present invention may comprise other additives. Various additives may be present to enhance a specific property or may be present as a result of processing of the individual components. Additives which may be incorporated include, for example, fire retardants, antioxidants, plasticizers, pigments, vulcanizing or curative agents, vulcanizing or curative accelerators, cure retarders, processing aids, flame retardants, and the like. These compounds may include fillers (including granular, fibrous, or powder-like) and/or reinforcing materials. These include carbon black, clay, talc, calcium carbonate, mica, silica, silicate, glass combinations thereof, and the like. Other additives which may be employed to enhance properties include antiblocking agents, coloring agents. Lubricants, mold release agents, nucleating agents, and reinforcements may also be employed. The list described herein is not intended to be inclusive of all types of additives which may be employed with the present invention. Upon reading this disclosure, those of skill in the art will appreciate other additives may be employed to enhance properties of the composition. As is understood by the skilled in the art, the polymer blend compositions of the present invention may be modified to adjust the characteristics of the blend as desired.

The addition of process aids, such as a mixture of fatty acid ester or calcium fatty acid soap bound on mineral filler, to the compositions described herein may help the mixing of the composition and the injection of the composition into a mold. Other examples of process aids are low molecular weight polyethylene copolymer wax and paraffin wax. The amount of process aid used may be within the range of from 0.5 to 5 parts by weight per hundred parts total polymer.

Adding antioxidants to the compositions described herein may improve the long term aging. Examples of antioxidants include, but are not limited to quinoline, e.g., trimethylhydroxyquinoline (TMQ); imidazole, e.g., zincmercapto tolyl imidazole (ZMTI), and conventional antioxidants, such as hindered phenols, lactones, and phosphites. The amount of antioxidants used may be within the range of from 0.01 to 5 parts by weight per 100 parts total polymer components by weight. A useful anti-oxidant is Irganox™ 1010.

Blends of PDC and STPB

The STPB polymers of this invention typically have high viscosities (low MFR values) and there is a need to have the viscosities to be low enough so that they can be processed in conventional thermoplastic molding and fabricating machinery. One process of achieving that would be added process oil or other plasticizers. Such additions while beneficial in raising the MFR (lowering the viscosity) also lead to lower physical properties (e.g. tensile strength). It is the object of this invention to describe the use of PDC which when used as blend components with STPB polymers leads to compositions which retain the softness of STPB with a higher MFR without significantly deteriorating of the physical properties (as measured by tensile strength).

This invention further relates to (1) a low molecular weight (Mw of less than 100,000 g/mol) PDC comprising propylene copolymer having a low crystallinity at modest levels of α-olefin used to prepare and process polymer compositions, and (2) polymeric compositions comprising a soft, plasticized, homogeneous high flow blend of the PDC with a soft thermoplastic blend (STPB). In one embodiment, the blend composition can be heterogeneous, and in another embodiment, homogeneous. In one embodiment the STPB component comprises a thermoplastic matrix phase having a melting point greater than about 110° C. and a dispersed elastomeric phase in particles less than 10 μm in diameter (mean average).

In a preferred embodiment, this invention relates to a polymeric composition having an MFR of at least 1 g/10 min and a flexural modulus less than 100 MPa comprising:

(i) from about 1 wt % to about 99 wt %, based on the total weight of hydrocarbons in the polymeric composition, of a propylene polymer component comprising (preferably consisting essentially of) at least one propylene copolymer comprising from 95 wt % to 75 wt % propylene (preferably 92 wt % to 80 wt %, more preferably 90 wt % to 80 wt %) and 5 wt % to 25 wt % comonomer (preferably 8 wt % to 20 wt %, more preferably 10 wt % to 20 wt %) based upon the weight of the copolymer, wherein the propylene copolymer has an MFR from 250 to 7500 g/10 min, an annealed Hf between 0.5 and 40 J/g, and an mm triad tacticity index of at least 75%; and (ii) blended therewith, from about 99 wt % to about 1 wt %, based on the total weight of hydrocarbons in the polymeric composition, of a soft thermoplastic polymer blend component.

In a preferred embodiment, the PDC is present at from 5 wt % to 50 wt % (preferably 10 wt % to 45 wt %) and the STPB component is present at from 95 wt % to 50 wt %

(preferably 90 wt % to 55 wt %), based upon the weight of the hydrocarbon components of the polymeric composition.

In another preferred embodiment, this invention relates to a polymeric composition comprising a blend of: (a) a blend of a propylene copolymer (as defined here in) and a polyolefin polymer (a TPC, as defined above) having a $T_m$ above 100° C. (such as isotactic polypropylene) and (b) an STPB or a blend of an STPB with another polyolefin having a melting point of more than 100° C. (such as propylene homopolymers, random propylene copolymers and propylene-styrene block copolymers). In another embodiment the blend comprises a propylene copolymer and a blend of an STPB with another polyolefin having a melting point of more than 110° C. (such as propylene homopolymers, random propylene copolymers and propylene-styrene block copolymers). In a particular embodiment, the STPB component can contain isotactic polypropylene, and random copolymers of propylene and α-olefins including ethylene, wherein the polyolefin component contains at least 90% by weight of the polyolefin component of propylene derived units.

In another embodiment, the present invention relates to blends of STPB and PDC, which are toughened, as measured by the area under the stress strain curve of elongation to break, and processable, as measured by MFR.

In embodiments, the blend composition described above can have an MFR of at least 1, 3, 5, 10, 25, 50, 100, 200 or 500 dg/min.

In one embodiment, the MFR of the inventive blend made comprising the PDC is greater than that of a comparative blend without the PDC, preferably greater than 1.2 times the MFR of the comparative blend, preferably greater than 2 times the MFR of the comparative blend, preferably greater than 7 times the MFR of the comparative blend or more preferably greater than 15 times the MFR of the comparative blend.

In another embodiment, the polymeric compositions described herein have a Shore A hardness (ASTM 2240, 5 sec interval) of at most 95, preferably at most 80, preferably at most 60, preferably at most 40 and even more preferably at most 20.

In another embodiment, the polymeric compositions described herein have a tensile strength (ASTM D 790, modified as noted in Example section below) of less than 40 MPa, preferably less than 20 MPa, preferably less than 12 MPa and preferably less than 5 and preferably less than 2 MPa.

In another embodiment, the polymeric compositions described herein have a Ultimate Elongation (ASTM D 790, modified as noted in Example section below) of greater than 30%, preferably greater than 100%, preferably greater than 200% and preferably greater than 400% and even more preferably greater than 800%.

In another embodiment, the polymeric compositions described herein have a 300% Modulus (ASTM D 790, modified as noted in Example section below) of less than 14 MPa, preferably less than 10 MPa, preferably less than 4 MPa and preferably less than 1 MPa.

In another embodiment, the T½ of the inventive blend made comprising the STPB component and the optional amount of TPC and PDC is less than that of the SPTB made with the same ingredients and the optional amount of TPC except that the PDC is absent. The T½ of the inventive compositions is preferably 80% of the STPB, more preferably 60% of the STPB and even more preferably 50% of the STPB.

It is understood that the PDC may be present in either or both phases of the STPB component, especially in the thermoplastic phase, and may be miscible or immiscible in either or both phases of the STPB component. In one embodiment, the PDC is present in the thermoplastic phase, and in another embodiment the PDC is miscible with the thermoplastic phase. In another embodiment, the PDC is homogenously dispersed in the thermoplastic phase. Even though the PDC is miscible with one phase of the TPO or TPV, it is still a heterogeneous blend because the final product still has 2 phases.

In a preferred embodiment, the PDC component comprises from 10% to 25% by weight of the hydrocarbon components of the blend, the STPB component comprises from 50% to 75% by weight of the hydrocarbon components of the blend, with the balance of the hydrocarbon components, if any, of the blend comprising process oil. In another embodiment, the preferred blend also contains from 10% to 20% of inorganic filler by total weight of the hydrocarbon components of the blend.

It is understood that any or all of the above embodiments are directed to a process for preparing thermoplastic fabricated articles from these thermoplastic polymer blends. The process comprises: (a) generating the thermoplastic blend (as described immediately above), and (b) forming the thermoplastic article by casting, blowing, injection molding, extrusion, rotomolding or compression molding as known in the art.

This disclosure relates to polymeric compositions that have processability characteristics enabling the compositions to be used in a variety of product forms while having beneficial physical properties such as tensile strength, toughness and elastic properties. For example, in one embodiment, the polymeric compositions demonstrate good processability in traditional processes like extrusion, injection molding, blow molding, compression molding, rotational molding, calendaring, etc., while exhibiting toughness, softness, good tensile strength, and low tension set and hysteresis. The combination of processability and physical properties makes the polymeric compositions useful in a variety of applications such as films, fibers, woven and non-woven fabrics, sheets, molded objects, extruded forms, thermoformed objects, and all products made from such application materials. Another embodiment of the invention provides an automotive part selected from bumper fascia, interior door skins, air bag covers, side pillars and the like, made by injection molding the composition described above.

Another embodiment of the invention provides a process for making the polymeric composition described above. The process can include melt blending the propylene-dominated copolymer component and the soft thermoplastic blend component.

The polymeric composition can further contain from about 1 wt % to about 98 wt % (based upon the weight of the hydrocarbon components of the polymeric composition) of a tertiary polymer component (TPC) as defined above.

In a preferred embodiment the TPC is present at 1 wt % to 65 wt %, preferably 5 wt % to 50 wt % and even more preferably from 10 wt % to 30 wt %.

Often commercial STPB's are sold as blends with polyolefins such as polypropylene, and process aids such as plasticizers and additives such as antioxidants. For purposes of this invention, any such polyolefin is considered a TPC. Likewise, propylene copolymers useful herein may also be sold commercially as blend with other polyolefins (such as isotactic polypropylene). For purposes of this invention any such polyolefin is considered a TPC.

In another embodiment, the polymeric composition can also include from 2 to 200 parts by weight of a plasticizer, as defined above, per hundred parts by weight of total polymer. Alternately the polymeric composition can contain form 0.5 wt % to 20 wt % plasticizer, based upon the weight of the polymeric composition.

In another embodiment, the present invention also relates to blends of STPB, TPC and PDC, which are malleable and processable as defined by an MFR of at least 1 dg/min (preferably at least 2 dg/min, preferably at least 5 dg/min and even more preferably 20 dg/min and yet more preferably more than 50 dg/min).

Preferred propylene polymers useful herein as TPC's include Escorene™ PP3155 and PP1105 available from ExxonMobil Chemical Co. of Houston, Tex.

Blending

It is understood that any or all of the above embodiments are directed to a process for preparing fabricated articles from the polymeric compositions described herein. The process comprises: (a) generating the polymeric compositions (as described above), and (b) forming the article by casting, blowing, injection molding, extrusion, rotomolding or compression molding as known in the art.

The polymeric compositions of the present invention may be prepared by any procedure that produces an intimate mixture of the components. For example, the components can be combined by melt pressing the components together on a Carver press to a thickness of about 0.5 millimeter (20 mils) and a temperature of about 180° C., rolling up the resulting slab, folding the ends together, and repeating the pressing, rolling, and folding operation about 10 times. Internal mixers are particularly useful for solution or melt blending. Blending at a temperature of about 180° C. to 240° C. in a BRABENDER Plastograph for about 1 to 20 minutes has been found satisfactory. Still another method that may be used for admixing the components involves blending the polymers in a BANBURY internal mixer above the flux temperature of all of the components, e.g., 180° C. for about 5 minutes. A complete mixture of the polymeric components is indicated by the uniformity of the morphology of the dispersion of the components of the mixture. Continuous mixing may also be used. These processes are well known in the art and include single and twin screw mixing extruders, static mixers for mixing molten polymer streams of low viscosity, impingement mixers, as well as other machines and processes, designed to disperse the PDC and the STPB in intimate contact.

As discussed above, the unique combination of processability and performance attributes of the polymeric compositions described herein make them useful to produce a variety of different types of materials to produce a wide assortment of products. Among the materials that may be produced using the polymeric compositions described herein are films, fibers, woven and non-woven fabrics, sheets, molded objects, extruded forms, and thermoformed objects. In particular the unanticipated ability of the PC to lower the viscosity of the blend composition containing STPB relative to process oil and yet retain softness and malleability leads to the formation of elastic, extensible and soft blend compositions which can be easily processed and fabricated into a range of different forms. The following describes the manner in which some of these materials may be formed from the polymeric compositions described herein.

Fabrication

The fabricated articles of this invention are prepared by known thermoplastic fabrication methods, and particularly by known thermoplastic molding methods, such as injection, compression, blow, rotational, extrusion, reaction, gas assisted injection molding (GAIN), and injection molding techniques. The fabricated articles of this invention can also be made using sheet extrusion, film extrusion, coextrusion, lamination, extrusion coating, blown film, and cast film. The film can be non-oriented or oriented in the machine or non-machine direction, the film can also be oriented in both directions (BIAX) via the tenter frame or the double bubble process.

The disclosed molded parts may also be fabricated using a co-injection molding process, whereby an injection mold is used to form the part and/or lid and the materials are co-injected into the mold to form separate skins. Also, the part and/or lid can be fabricated using an overmolding process, whereby one of the layers is molded first and the other layers are molded over the previously molded structure. Conventional injection molding and thermal molding may also be utilized. Further, injection molding and blow molding techniques may be combined by injection molding a preform, which is transferred to a blow mold, and inflated to form an outer structure with inner structures or layers blown into the outer structure. The process can be repeated to form as many layers as desired.

Yarns and fibers: In one embodiment, the polymeric compositions may be used to produce fibers. Fibers of the polymeric compositions described herein have desirable softness and elastic properties and may be used in various applications, for example, continuous filament yarn, bulked continuous filament yarn, staple fibers, melt blown fibers, and spunbond fibers. In one embodiment, the elastic recovery, stress relaxation, and tensile recovery properties of the fibers of the invention may be enhanced by annealing and/or mechanical orientation. The fiber may be annealed at a temperature of at least 4° C.-5° C. above room temperature, or at least 6° C.-7° C. above room temperature, but slightly below the Tm of the blend composition. Alternately the fiber is maintained at a temperature of from room temperature to 160° C., or 130° C., for a period of from 15 seconds to 7 days, typically 3 days at 50° C. or 5 minutes at 100° C. Mechanical orientation can be a part of the annealing process after the extrusion operation and may be done by the temporary, forced extension of the polymer fiber for a short period of time before it is allowed to relax in the absence of extensional forces. Oriented polymer fibers are prepared by maintaining the polymer fibers at an extension of 100% to 700% for a period of 0.1 seconds to 24 hours, typically 200% for a momentary period at room temperature.

In one embodiment, the invention provides fabrics made with the fibers made of the polymeric compositions described herein. The fabrics may be made by any of the known processes for making non-woven or woven fabrics.

Molded Products: The polymeric composition described above may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, vacuum forming, slush molding, transfer molding, wet lay-up or contact molding, cast molding, cold forming matched-die molding, spray techniques, profile co-extrusion, or combinations thereof are typically used methods.

Thermoforming, useful with the inventive compositions herein, is typically accomplished by vacuum, positive air pressure, plug-assisted vacuum forming, or combinations and variations of these, once the sheet of material reaches Thermoforming temperatures are typically from 140° C. to 185° C. or higher. In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 um to 6000 um in one embodiment, from 200 um to 6000 um in another embodiment, and from 250 um to 3000 um in yet another embodiment, and from 500 um to 1550 um in yet another embodiment, a desirable range being any combination of any upper thickness limit with any lower thickness limit.

Blow molding is another suitable forming means for the compositions described herein, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, Kroschwitz, *Concise Encyclopedia of Polymer Science and Engineering*, John Wiley & Sons, 90-92 (1990).

In yet another embodiment of the formation and shaping process, profile co-extrusion can be used. The profile co-extrusion process parameters are typically the same as a blow molding process, except the die temperatures (dual zone top and bottom) range from 150° C.-235° C., the feed blocks are from 90° C.-250° C., and the water cooling tank temperatures are from 10° C. to 40° C.

Two shot overmolding: Overmolding with the soft thermoplastic composition can be achieved by a two shot or multi-component injection molding process or co-injection molding process. Such processes are generally described in "Special Technologies for Injection Moulding of TPE", Peter Pokomy, Engel Maschinebau GmbH, TPE 2000, 6 & 7 Mar. 2000, Paper 17, Amsterdam, conference proceedings. The teachings of this reference are incorporated herein by reference. The soft-thermoplastic elastomer overmolded onto the hard thermoplastic resin substrates are also described in "New Horizons in Thermoplastic Elastomers", Stephen J. Duckworth, M. A. Hanna Engineered Materials Europe, TPE 2000, 6 & 7 Mar. 2000, Paper 5, Amsterdam, and the teaching thereof are also incorporated herein by reference. The soft overmolding can also be accomplished by insert injection molding carried out in two steps. In the first step, the thermoplastic substrate is molded and is subsequently inserted in another cavity for overmolding in the next step into the soft thermoplastic elastomer. The soft thermoplastic elastomers can be overmolded on a rigid metal substrate by insert injection molding processes. The soft thermoplastic elastomer composition can also be processed by either an extrusion or an injection molding process and the formed soft sleeve can be slipped onto the solid thermoplastic or metal substrate.

Tubing or pipe may be obtained by profile extrusion of the polymeric compositions described herein for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness in the range of from 254 um to 0.5 cm. The pipe will generally be in the range of from 2.54 cm to 254 cm in outside diameter, and have a wall thickness in the range of from 0.5 cm to 15 cm.

Sheets of the compositions described herein may be made either by extruding a substantially flat profile from a die, onto a chill roll, or alternatively by calendaring. Sheets will generally have a thickness of from 100 to 2000 μm although the sheets may be substantially thicker. Likewise, sheets made from the polymeric compositions described herein may be used to form containers by thermoforming, solid phase pressure forming, stamping and other shaping techniques. Sheets may also be formed to cover floors or walls or other surfaces.

The polymeric compositions described herein are also useful for the production of films. Methods for making the films of the compositions described herein include those which are well known to those of ordinary skill in the art, including, but not limited to conventional tubular extrusion, or a blown bubble process, and cast extrusion. The extrusion temperatures, die temperatures, and chill roll temperatures are dependent on the composition employed, but will generally be within the following ranges: melt temperature, 170° C. to 250° C.; die temperature, 170° C. to 250° C.; and chill roll temperature, 10° C. to 65° C. The film-making process may also include embossing rolls to chill and form the film.

The films of the invention may have a layer adhered to one or both sides of the film comprising the polymeric compositions described herein. The layers may be adhered by coextrusion of the film with the optional additional layer or layers. In coextruded films, the individual layers are different in composition and retain their composition except at the interface layer. The optional additional layer may be, for example, a soft material such as an ethylene copolymer which may reduce the adhesive (i.e., sticky) feel of the inventive film. The optional additional layer may also be, for example, a thermoplastic. A thermoplastic layer may be used, for example, as a mechanical support for an elastic film to prevent sag, and as a barrier to adhesion of the polymer film to other surfaces. A thermoplastic layer may become a part of the integral use of an elastic film in that the composite film is stretched beyond the yield point of the thermoplastic layer, e.g., greater than 50% elongation, and allowed to retract due to the elastic forces of the elastic film. In this use, the thermoplastic film is wrinkled to yield a desirable surface finish of the composite elastic film. The thermoplastics that may be used for this purpose include, but are not limited to polypropylene and polyethylene.

In one embodiment, the mechanical properties, such as elastic recovery and stress relaxation, of films of the invention may be enhanced by thermal annealing and/or mechanical orientation. Thermal annealing is conducted by maintaining the polymer blend or article made from the blend at a temperature between room temperature and 160° C. for a period of from 15 seconds to 7 days. A typical annealing period is 3 days at 50° C. or 5 minutes at 100° C. Mechanical orientation can be done by the temporary, forced extension of the blend along one or more axes for a short period of time before it is allowed to relax in the absence of extensional forces. Orientation is conducted by maintaining the polymer blend or article made from the blend at an extension of 10% to 400% for a period of 0.1 seconds to 24 hours. A typical orientation is an extension of 200% for a momentary period (generally less than 1 minute) at room temperature. Orientation of a film may be carried out in the machine direction (MD) or the transverse direction (TD) or both directions (biaxially) using conventional equipment and processes.

End Uses

Soft touch applications for which the compositions of this invention are useful include automotive overshoot parts (e.g., door handles and skins such as dashboard, instrument panel and interior door skins), airbag covers, toothbrush handles, shoe soles, grips, skins, toys, appliance moldings and fascia, gaskets, furniture moldings and the like.

Other articles of commerce that can be produced from this invention include but are not limited by the following examples: awnings and canopies—coated fabric, tents/tarps coated fabric covers, curtains extruded soft sheet, protective cloth coated fabric, bumper fascia compounded TPO, instrument panel and trim skin, coated fabric for auto interior, geo textiles, appliance door gaskets, liners/gaskets/mats, hose and tubing, syringe plunger tips, light weight conveyor belt PVC replacement, modifier for rubber concentrates to reduce viscosity, single ply roofing—amorphous poly-alpha olefin (APAO) modification, TPO roofing and viscosity modification of standard roofing formulations, recreation and sporting goods, grips for pens, razors, toothbrushes, handles, etc, marine—items requiring a soft, flexible surface combined with chemical and salt water resistance, belting, pillow tanks, ducting, dunnage bags, architectural trim and molding, collapsible storage containers—which are sold under the brand names Rubbermaid/Tupperware, synthetic wine corks, IV and fluid administration bags and examination gloves made without natural latex rubber which causes an allergic reaction in certain individuals.

Exemplary articles made using the polymeric compositions described herein include cookware, storageware, toys, medical devices, sterilizable medical devices, sterilization containers, sheets, crates, containers, packaging, wire and cable jacketing, pipes, geomembranes, sporting equipment, chair mats, tubing, profiles, instrumentation sample holders and sample windows, outdoor furniture, e.g., garden furniture, playground equipment, automotive, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles. In particular, the polymeric compositions described herein are useful for producing "soft touch" grips in products such as personal care articles such as toothbrushes, etc.; toys; small appliances; packaging; kitchenware; sport and leisure products; consumer electronics; PVC and silicone rubber replacement medical tubing; industrial hoses; and shower tubing.

In another embodiment, this invention relates to:
1. A polymeric composition comprising:
   from about 1 to about 99 wt %, based on the total weight of hydrocarbons in the polymeric composition, of a propylene-dominated copolymer component comprising comonomer derived units other than propylene and at least 65 wt % propylene derived units, by weight of the copolymer, wherein the copolymer has an MFR at 230° C. and 2.16 kg from 250 to 7500 dg/min, a heat of fusion between 0.5 and 40 J/g, and an isotactic triad fraction of at least 75 percent;
   in intimate admixture therewith, from about 99 to about 1 wt %, based on the total weight of hydrocarbons in the polymeric composition, of a soft thermoplastic blend component comprising a thermoplastic matrix phase having a melting point greater than about 110° C. and a dispersed elastomeric phase in particles less than 10 μm in average (mean) diameter, the soft thermoplastic blend component having an MFR less than 200 g/10 min.
2. The polymeric composition of paragraph 1 wherein the polymeric composition has a melting temperature within 10° C. of the soft thermoplastic blend component.
3. The polymeric composition of paragraph 1 or 2 wherein the polymeric composition has an MFR greater than the soft thermoplastic blend component, a tensile toughness greater than the soft thermoplastic blend component, or both.
4. The polymeric composition of paragraph 1, 2 or 3 having an MFR of at least 1 dg/min and a 1% Secant flexural modulus of from 1 to 100 MPa.
5. The polymeric composition of any of paragraphs 1 to 4 wherein the composition is easily moldable.
6. The polymeric composition of any of paragraphs 1 to 5 wherein the polymeric composition has one or more of the following characteristics: a) a tensile strength of less than 40 MPa. b) an Ultimate Elongation of greater than 30%, and c) a 300% modulus of less than 14 MPa.
7. The polymeric composition any of paragraphs 1 to 6 wherein the soft thermoplastic blend component comprises from about 80 to about 99 percent of the composition and the propylene dominated copolymer comprises from about 1 to about 20 percent of the composition, based on the total weight of hydrocarbons in the polymeric composition.
8. The polymeric composition any of paragraphs 1 to 7 wherein the propylene-dominated copolymer comprises at least 75 wt % of the propylene-derived units and at least 5 wt % of the comonomer units derived from monomers other than propylene.
9. The polymeric composition any of paragraphs 1 to 8 wherein the propylene-dominated copolymer comprises from about 5 wt % to about 20 wt % ethylene-derived units.
10. The polymeric composition any of paragraphs 1 to 9 wherein the propylene-dominated copolymer comprises from about 0.5 to about 3 wt % diene derived units by weight of the propylene-dominated copolymer component.
11. The polymeric composition of any of paragraphs 1 to 10, wherein the propylene-dominated copolymer component comprises:
   a melting point between 25° C. and 110° C.;
   a heat of fusion from 1.0 to 125 J/g;
   a tacticity index (m/r) from 4 to 12;
   an intermolecular tacticity such that at least 75 wt % of the copolymer is soluble in two adjacent temperature fractions of a thermal fractionation carried out in hexane in 8° C. increments;
   a reactivity ratio product $r_1 r_2$ of less than 1.5; and
   a molecular weight distribution Mw/Mn between 1.5 and 40.
12. The polymeric composition of any of paragraphs 1 to 11 wherein the propylene-dominated copolymer component comprises one or more of the following characteristics:
   an elasticity in percent equal to or less than 0.935M+12 where M is the 500% tensile modulus in MPa and is at least 0.5 MPa;
   a proportion of inversely inserted propylene units greater than 0.5%, based on 2,1 insertion of propylene monomer in all propylene insertions;
   a proportion of inversely inserted propylene units greater than 0.05%, based on 1,3 insertion of propylene monomer in all propylene insertions;
   less than 10000 ppm by weight of the copolymer of a molecular degradation agent or its reaction products.

13. The polymeric composition of any of paragraphs 1 to 12 wherein the propylene-dominated copolymer component comprises a copolymer made in one or more steady-state reactors in the presence of a bridged metallocene catalyst.
14. The polymeric composition of any of paragraphs 1 to 13 wherein the thermoplastic phase of the soft thermoplastic blend component comprises an isotactic polypropylene or isotactic random copolymer of propylene and from 0.0% to 9% by weight of the thermoplastic phase of an alpha-olefin wherein the thermoplastic phase has a melting point greater than about 120° C. and an MFR of from 0.1 to 150.
15. The polymeric composition of any of paragraphs 1 to 14 wherein the thermoplastic phase of the soft thermoplastic blend component comprises from about 1 to about 98 wt % of the soft thermoplastic blend component of a polyolefin component having a melting point greater than about 120° C. and selected from the group consisting of propylene homopolymers, random propylene copolymers and propylene-styrene block copolymers.
16. The polymeric composition of claim 15 wherein the polyolefin component is selected from isotactic polypropylene, and random copolymers of propylene and α-olefins including ethylene, wherein the polyolefin component contains at least 90% by weight of the polyolefin component of propylene derived units.
17. The polymeric composition of any of paragraphs 1 to 16 wherein the elastomeric phase of the soft thermoplastic blend component is selected from the group consisting of natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), ethylene plastomers, polysulfide, nitrile rubber, propylene oxide polymers, star-branched butyl rubber, halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), and mixtures thereof.
18. The polymeric composition of any of paragraphs 1 to 17 wherein the elastomeric phase of the soft thermoplastic blend component is vulcanized.
19. A process for making the polymeric composition of any of paragraphs 1 to 18, comprising melt blending the propylene-dominated copolymer component and the soft thermoplastic blend component.
20. The process of claim 19 further comprising forming a film, fabric, fiber, sheet, molded object, extruded form or thermoformed article from the melt.
21. The polymeric composition of any of paragraphs 1 to 18 formed in a film, fabric, fiber, sheet, molded object, extruded form or thermoformed article.
20. The polymeric composition obtained from the process of claim 19.
21. An automotive part comprising an injection molded composition of any of paragraphs 1 to 18, wherein the automotive part is selected from the group consisting of bumper fascia, interior door skins, air bag covers, and side pillars.
22. The use of any of the polymeric composition of any of paragraphs 1 to 18 as a film, fabric, fiber, sheet, molded object, extruded form or thermoformed article.

EXAMPLES

PDC compositions were determined according to the type and the amount of the comonomer present. Ethylene content of the propylene-ethylene copolymers was determined using a thin homogeneous film pressed according to sub-method A of ASTM D-3900. The film was then mounted on a Perkin Elmer Spectrum 2000 infrared spectrophotometer. A full spectrum was recorded with a resolution of 4.0 cm$^{-1}$ and a spectral range of 4500 to 450 cm$^{-1}$. Ethylene content was determined by taking the ratio of the propylene band area at 1155 cm$^{-1}$. to the ethylene band area at 732 cm$^{-1}$ and applying the following equation:

Wt % Ethylene=73.492-89.298$X$+15.637$X^2$ where X=AR/(AR+1) and AR is the propylene-to-ethylene peak area ratio (1155 cm$^{-1}$/722 cm$^{-1}$). For α-olefin comonomers other than ethylene, the $^{13}$C NMR technique described in Macromol. Chem. Phys., vol. 201, p. 401 (2000) for the determination of hexene content in propylene/hexene copolymers was used. The procedure involves collecting a $^{13}$C NMR spectrum on a polymer sample dissolved in tetrachloroethane-d2 and integrating the spectral intensity. The mole percent hexene was determined by taking the ratio of peak integrals corresponding to the number of moles of hexene to the number of moles of all monomers in the sample.

Molecular weight (Mn and Mw) by GPC was determined for the polyolefins, including the PDC and isotactic polypropylene (iPP), using a Waters 150 size exclusion chromatograph (SEC) equipped with a differential refractive index detector (DRI), an online low angle light scattering (LALLS) detector and a viscometer (VIS), with detector calibrations described in Sun et al., Macromolecules, vol. 34, no. 19, pp. 6812-6820 (2001).

Blending of the compositions was effected in a 400 mL MIDGET mixer with an approximately 80 percent fill at 200° C. for 5 minutes. Two batches of each formulation were prepared to obtain about 600 g for testing. The product was milled and cut into strips. A small POLYLAB extruder was used to extrude and pelletize the blends.

Molding of tensile dumbbells (ASTM D 638, Type IV) and flexure specimens (ASTM D 790A) was done using a 199 kN (20 ton) NISSEI NS 20 injection molding machine according to ASTM D 4101, except for the following provisions. For TPOs and PDC-modified TPOs, the mold temperature was about 32° C.; the inject time was 30 seconds; and the melt temperature was up to 10° C. off, but always in the range of 190° C.-200° C. For TPVs and PDC-modified TPVs, the mold temperature was about 50° C.; the inject time was 30 seconds; and the melt temperature was up to 10° C. off, but always in the range of 230° C.-240° C.

Flexural modulus: Flexure properties at room temperature, including the 1% secant modulus, were determined according to ASTM D 790A using a 1.27 mm/minute (0.05-in./min) test speed and a 50.8 mm (2-in.) support span.

Hardness of each polymer or blend was measured with a portable hardness Type A durometer and a Type D durometer (in Table 7 only) made by SHORE® Instrument & Mfg. Co., Inc., Freeport, N.Y. according to ASTM D2240. The test samples were formed by stacking three 2 mm-thick molded plaques. The 5 second value was reported.

Shore Hardness for Shore D at 15 sec interval (unless otherwise noted) and Shore A at 5 sec interval (unless otherwise noted) was measured according to ASTM D2240-05.

Stress-strain measurements under tension were performed in an INSTRON tester according to ASTM D638 (Type IV dumbbells for nonrigid plastics). Measurements using five specimens, conditioned under ambient conditions for 24 hours prior to testing, were performed at room temperature and at a separation speed of 50.8 mm/minute (2-in./min). The stress was calculated based on the undeformed cross-sectional area of the test specimen. Strain measurements were based on clamp separation. The tensile toughness was measured as the total area under the stress-strain curve.

MFR was determined according to ASTM D1238 at 230° C. under a load of 2.16 kg and is reported as dg/min.

Shear viscosity as a function of shear rate was measured by a capillary rheometer maintained at a temperature of 190° C.

DSC measurement of Tc, Tm, Delta Hf, T½% crystallinity: DSC was used according to ASTM D 3418 to measure the crystallization temperature $T_c$, and the peak melting temperature $T_m$ in ° C., heat of fusion (Delta Hf in J/g), and crystallization half time T½ in minutes. The following procedure was used. DSC data were obtained using a TA Instruments model 2920 machine. Samples weighing approximately 7-10 mg were molded and sealed in aluminum sample pans. After 48 hours at room temperature (21° C. to 25° C.) the samples were analyzed. The DSC data were recorded by first cooling the sample to −50° C. and then gradually heating it to 200° C. at a rate of 10° C./minute. This sequence of operation was the first heating cycle. The sample was kept at 200° C. for 5 minutes before a cooling cycle was applied at 10° C./minute to −50° C. This was the second cooling cycle. The sample was heated again to 200° C. at a rate of 10° C./minute. This was the second heating cycle. The Tm and the Hf were obtained from the second heating cycle. The Tc was determined from the second cooling cycle. The crystallization half-time, $T_{1/2}$, was determined by keeping the sample at 200° C. for 10 minutes before a cooling ramp was applied at 150° C./minute to 148° C. followed by a second cooling ramp at 40° C./minute to the isothermal crystallization temperature, Tx, (e.g., 128° C.). The sample was held at Tx for 45 minutes or until crystallization was complete. The $T_{1/2}$ is the time required to evolve 50% of the total heat flow recorded during isothermal crystallization. The percent crystallinity (X%) of the propylene polymers is calculated using the formula: [area under the curve (in J/g)/189 J/g]*100.

For the various polymers and their compounds, second-melt data were used.

Heat distortion temperature (HDT) was measured according to ASTM D 648. The maximum surface stress applied to the sample was 0.46 MPa (66 psi).

Gloss @ 60 degrees was measured on plaques using ASTM D523-89 procedures.

Haze (%) was measured according to D10003-00 Haze Only.

Fracture energy (ft-lb) was measured according to ASTM D3763-06.

Notched Izod Impact Strength was measured according to ASTM D 256 method A, expect that the samples were stored at −40° C. overnight before being notched.

Vicat softening point was determined using a CEAST HDT 300 Vicat instrument. A needle of 1-mm area was applied with a force of 200 g to the specimen surface submerged in DOW 220 heat transfer fluid, while the temperature was raised at a heating rate of 120° C./hr. The temperature at which the needle penetrated to a depth of 1 mm into the sample was reported as the Vicat softening point.

200% tensile hysteresis. The 200% hysterisis represented by the fractional increase in the length of the sample over two cycles of 200% unidirectional distension, represented as percent of the length of the sample, is measured according to the general procedure ASTM D790. During this determination, the blend sample is stretched, and it attempts to recover its original dimensions when the stretching force is removed. This recovery is not complete, and the final length of the relaxed sample is slightly longer than that of the original sample. 200% hysterisis is represented by the fractional increase in the length of the sample, expressed as a percent of the length of the original un-stretched sample.

The protocol for measuring the 200% tensile hysteresis of the sample consists of stretching the deformable zone of the dumbbell, made according to the procedure described above, which is the narrow portion of the specimen, to 200% of its original length to stretch the sample. The original length of the distention zone, the narrow part of the dumbbell, is $d_0$. The sample distention is conducted at a deformation rate of 10" (25 cm) per minute. The energy used for the distention is the integral of the area under the force used versus the distention of the deformation zone. This energy used is E1 for cycle 1. The sample is relaxed or contracted at the same rate to complete the first cycle. The energy recovered in the contraction is the integral of the area under the force used versus the distention of the deformation zone. This energy recovered is E2 for cycle 1. The length of the deformation zone in the sample is measured to be $d_1$. Typically $d_1$ is greater than $d_0$. After 5 or more minutes, the sample is remounted on the Instron tester where it is again deformed at 10"/minute for a 200% extension of the deformation zone of the sample and allowed to relax at the same rate. The energy used for the distention is the integral of the area under the force used versus the distention of the deformation zone. This energy used is E1 for cycle 2. The energy recovered for the contraction is the integral of the area under the force used versus the distention of the deformation zone. This energy used is E2 for cycle 2. The sample is removed and the sample is measured to have a new length of the deformation zone of $d_2$. Typically $d_2$ is larger than $d_1$.

The following parameters are defined:

First cycle tension set (%)=100*$(d_1-d_0)/d_0$

Second cycle tension set (%)=100*$(d_2-d_1)/d_1$

Energy used in cycle 1=E1 for cycle 1−E2 for cycle 1

Energy used in cycle 2=E1 for cycle 2−E2 for cycle 2.

Procedures for production of PDC1 to PDC10 included polymerization in a liquid filled, single-stage continuous reactor using a single metallocene catalyst system. The reactor was a 0.5-liter stainless steel autoclave reactor and was equipped with a stirrer, water cooling/steam heating element with a temperature controller, and a pressure controller. Solvents, propylene, and comonomers, (such as ethylene, hexene, hexane and octane), were first purified by passing through a three-column purification system. The purification system consisted of an Oxiclear column, Model # RGP-R1-500 from Labelear, followed by 5A and 3A molecular sieve columns. Purification columns were regenerated periodically whenever there was evidence of lower activity of polymerization. Both the 3A and 5A molecular sieve columns were regenerated in-house under nitrogen at a set temperature of 260° C. and 315° C., respectively. The molecular sieve material was purchased from Aldrich. Oxiclear column was regenerated in the original manufacture. The purified solvents and monomers were then chilled to about −15° C. by passing through a chiller before being fed into the reactor through a manifold. Solvent and monomers were mixed in the manifold and fed into reactor through a single tube. All liquid flow rates were measured using Brookfield mass flow meters or Micro-Motion Coriolis-type flow meters.

The catalyst was rac-dimethylsilylbisindenyl hafnium dimethyl (obtained from Albemarle) pre-activated with N,N-dimethylanilinium tetrakis (pentafluorophenyl) borate (obtained from Albemarle) at a molar ratio of about 1:1 in toluene. The catalyst solution was kept in an inert atmosphere with <1.5 ppm water content and was fed into the reactor by a metering pump through a separated line. Catalyst, activator and monomer contact took place in the reactor. 3.37×10-7 moles/minute of the catalyst (activated in situ) was continuously added to the reactor. As an impurity scavenger, 250 ml of tri-n-octyl aluminum (TNOA) (25 wt % in hexane, Sigma Aldrich) was diluted in 22.83 kg hexane and pumped into the reactor at a rate of 1.8 ml/minute.

The reactor was first cleaned by continuously pumping solvent (e.g., hexane) and scavenger through the reactor system for at least one hour at a maximum allowed temperature (about 150° C.). After cleaning, the reactor was heated or cooled to the reaction temperature of 80° C. using a water/steam mixture flowing through the reactor jacket and controlled at a set pressure with controlled solvent flow. Monomers and catalyst solutions were then fed into the reactor when a steady state of operation was reached. Propylene was added at the rate of 14 g/minute. For PDC copolymers which are copolymers of ethylene was measured volumetrically as a gas and added at a rate of Xe liter (measured at 0° C. and 1 bar pressure) per minute where Xe is defined in the Table 1B below. For PDC copolymers which are copolymers of hexane, it was measured volumetrically as a liquid and added at a rate of Xh ml (measured at 21° C. and 1 bar pressure) per minute where Xh is defined in the Table 1B below. An automatic temperature control system was used to control and maintain the reactor at a set temperature Onset of polymerization activity was determined by observations of a viscous product and lower temperature of water-steam mixture. Once the activity was established and the system reached equilibrium, the reactor was lined out by continuing operating the system under the established condition for a time period of at least five times of mean residence time prior to sample collection. The resulting mixture, containing mostly solvent, polymer and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2.41 MPa-g.

Procedures for recovery of PDC7 involved melt blending a sample corresponding to PDC7 at 250° C. in an extruder with 9 wt % of Achieve 6936G, an iPP made with metallocene catalysts (ExxonMobil Chemical Company; mhPP with MFR=1500±200 dg/min and $T_m$=156° C.; no peroxide but containing calcium stearate and Irganox 1076), and then extruded after cooling to approximately 160° C. through a multi-hole die with a pelletizing knife attached. The resulting extrudate was forced through the holes to form a strand about 6 mm (one-quarter inch) wide and then immediately pelletized underwater to form symmetrical pellets about 6 mm (one-quarter inch) on each dimension. The pellets were removed, dried and used as PDC7.

Ingredient properties for the materials used in the following examples are shown in Table 1A for the sample PDCs and Table IC for the thermoplastic olefin (TPO) and thermoplastic vulcanizate (TPV) resins.

TABLE 1A

Sample PDC Properties

| Material ID | Brookfield viscosity, 190° C. (mPa-s) | comonomer | $T_g$ (° C.) | $T_m$ (° C.) | ΔH (J/g) |
|---|---|---|---|---|---|
| PDC1 | 16,790 | ethylene (17 wt %) | −32 | 50[1] | 6[1] |
| PDC2 | 14,100 | ethylene (12 wt %) | −27 | 67[2] | 21[2] |
| PDC3 | 82,300 | ethylene (9 wt %) | −25 | 71[2] | 32[2] |
| PDC4 | 40,150 | ethylene (8 wt %) | −26 | 74[2] | 33[2] |
| PDC5[1] | 41,000 | hexene (14.5 wt %) | −16 | 70.2 | 9 |
| PDC6[1] | 34,000 | hexene (22 wt %) | −21 | 43 | near 0 |
| PDC7[3] | 9,000 | ethylene (16 wt %) | −34 | 46 | 14 |
| PDC8[1] | 12,200 | hexene (20 wt %) | −15 | 48 | 26 |
| PDC9[1] | 53,100 | hexene (13 wt %) | −16.9 | 75.8 | na |
| PDC10 | 41,000 | ethylene (17 wt %) | −28.7 | 59.7 | 6 |

Notes for Table 1A:
[1] This is propylene hexene copolymers analogous to the other propylene ethylene copolymer except it contains hexene instead of ethylene
[2] Data is reported for the first melt as the second melt data shows significant undercooling and distortion of the crystallization peak
[3] The PDC reported here was recovered as pellets and used as such after admixture with 9 wt % of Achieve 6936G (available from ExxonMobil Chemical Co, Houston, TX) as TPC in the molten state at 220° C. to 250° C. in a single screw extruder as described above. The data reported above is for the PDC7 alone, before admixture with the TPC.

TABLE 1B

Process conditions for PDC 1 through PDC 10

| Material ID | Xe (L/min) | Xh (ml/min) | Polymerization Temp (C.) |
|---|---|---|---|
| PDC1 | 1.2 | | 80 |
| PDC2 | 0.9 | | 80 |
| PDC3 | 0.6 | | 80 |
| PDC4 | 0.5 | | 80 |
| PDC5 | | 5.2 | 65 |
| PDC6 | | 7.2 | 67 |
| PDC7 | 1.2 | | 75 |
| PDC8 | | 6.4 | 65 |
| PDC9 | | 4.4 | 67 |
| PDC10 | 1.3 | | 77 |

TABLE 1C

Sample TPO, TPV and ICP Properties

| Material | Trade Designation | MFR (dg/min) |
|---|---|---|
| TPO1 | ADFLEX Z108S | 27 |
| TPO2 | ADFLEX V109F | 12 |
| TPO3 | SOFTELL CA02A | 0.6 |
| TPV1 | Santoprene 201-73W175 | — |
| TPV2 | Santoprene 201-64W175 | — |
| TPV3 | Santoprene 121-75M100 | — |
| ICP1 | Escorene PP9302E1 | 4 |
| ICP2 | Escorene 9122 | 2 |
| ICP3 | Escorene PP8244E1 | — |

Escorene PP 9302E1 is a polypropylene available prior to 2005 from ExxonMobil Chemical Co, of Houston Tex. having a 4% ethylene by composition and an MFR of 4 at 230° C. ICP 1 and 2 are commonly referred to as RCPs, however an examination of the phase morphology of the parent polymer indicates a dispersion of soft rubbery domains in a harder i-PP matrix.

Adflex and Softell TPO products were obtained from Basell Polyolefins of Wilmington, Del. Santoprene TPV and Escorene were obtained form ExxonMobil Chemical Co, Houston, Tex.

TABLE 1D

Sample Elastomer Properties

| Material | Trade Designation | MFR (dg/min) | Density (g/cc) | Tm (° C.) |
|---|---|---|---|---|
| E1 | EXACT ™ 5361 | 5.6 (190° C.) | 0.860 | 36 |
| E2 | VISTAMAXX ™ 6102 | 3 (230° C.) | 0.862 | — |

EXACT ™ and VISTAMAXX ™ polymers were obtained form ExxonMobil Chemical Co, Houston, TX.

TABLE 1E

Plasticizer Properties

| Material | Trade Designation | Kinematic Viscosity at 100° C. | Viscosity Index | Pour point ° C. | Specific gravity |
|---|---|---|---|---|---|
| P1 | SPECTRASYN ™ 10 | 10 cSt | 137 | −48 | 0.835 |
| P2 | FLEXON ™ 815 | 31.8 cSt | 101 | −9 | — |
| P3 | TUFFLO ™ 6056 | 12 cSt | — | −12 | 0.876 |

Spectrasyn ™ 10 was were obtained from ExxonMobil Chemical Co, Houston, TX.
Flexon ™ 815 was obtained from ExxonMobil Corp, Irving, TX.
Tufflo ™ was obtained from Citgo Petroleum Corp. of Tulsa, OK.

TABLE 2

| | Example | | | | | |
|---|---|---|---|---|---|---|
| | 1-1 | 1-2 | 1-3 | 1-4 | 1-5 | 1-6 |
| TPO1 | 100 | 90 | — | — | — | — |
| TPO2 | — | — | 100 | 90 | — | — |
| TPO3 | — | — | — | — | 100 | 90 |
| PDC1 | — | 10 | — | 10 | — | 10 |
| 1% Sec Mod, MPa | 69.5 | 51.8 | 76.2 | 57.1 | 38.7 | 31.5 |
| Shore A Hardness | 91 | 88 | 90 | 87 | 83 | 81 |
| 100% Modulus, MPa | 5.71 | 4.86 | 6.03 | 5.23 | 5.07 | 4.42 |
| 300% Modulus, MPa | 6.53 | 5.58 | 7.00 | 6.10 | 7.52 | 5.97 |
| Tensile Strength, MPa | 14.0 | 12.6 | 14.4 | 13.5 | 9.20 | 9.34 |
| Elongation at Break, % | 760 | 820 | 670 | 710 | 380 | 480 |
| Tensile Toughness, MPa | 92 | 88 | 83 | 80 | 33 | 40 |
| MFR (dg/min) | 22 | 27 | 13 | 17 | 0.72 | 1.3 |
| Shear Viscosity, Pa · s | | | | | | |
| @23.7 s$^{-1}$ | 692 | 579 | 1050 | 833 | 4490 | 3130 |
| @71.1 s$^{-1}$ | 481 | 408 | 665 | 546 | 2120 | 1550 |
| @237 s$^{-1}$ | 281 | 244 | 358 | 300 | 930 | 675 |
| @711 s$^{-1}$ | 151 | 133 | 180 | 154 | 395 | 310 |
| @2370 s$^{-1}$ | 68.1 | 61.2 | 78.4 | 68.2 | 138 | 123 |
| $T_m$, ° C. | 140 | 144 | 141 | 144 | 141 | 144 |
| HDT (66 psi), ° C. | 38 | 36 | 39 | 37 | 36 | 34 |
| Vicat (200 g), ° C. | 110 | 103 | 111 | 104 | 83 | 77 |

TABLE 3

| | Example | | | | | | | | | | |
|---|---|---|---|---|---|---|---|---|---|---|---|
| | 2-1 | 2-2 | 2-3 | 2-4 | 2-5 | 2-6 | 2-7 | 2-8 | 2-9 | 2-10 | 2-11 |
| TPV1 | 100 | 90 | 80 | — | — | — | — | — | — | — | — |
| TPV2 | — | — | — | 100 | 95 | 90 | 80 | — | — | — | — |
| TPV3 | — | — | — | — | — | — | — | 100 | 95 | 90 | 80 |
| PDC1 | — | 10 | 20 | — | 5 | 10 | 20 | — | 5 | 10 | 20 |
| 1% Sec Mod, MPa | 54.4 | 28.8 | 19.4 | 27.9 | 20.1 | 13.5 | 19.2 | 52.1 | 39.8 | 31.0 | 26.3 |
| Shore A Hardness | 77 | 71 | 70 | 64 | 65 | 62 | 60 | 81 | 78 | 79 | 74 |
| 100% Modulus, MPa | 4.97 | 3.92 | 3.48 | 3.56 | 3.09 | 2.70 | 2.98 | 4.04 | 3.67 | 3.31 | 3.27 |
| 300% Modulus, MPa | — | 5.54 | 4.79 | — | — | — | — | 5.54 | 4.84 | 4.29 | 4.08 |
| Tensile Strength, MPa | 6.82 | 6.34 | 5.58 | 4.84 | 4.26 | 3.85 | 3.07 | 6.49 | 5.52 | 4.69 | 4.27 |
| Elongation at Break, % | 290 | 390 | 430 | 230 | 240 | 250 | 120 | 400 | 390 | 370 | 350 |
| Tensile Toughness, MPa | 22 | 26 | 25 | 12 | 11 | 10 | 4.2 | 27 | 24 | 20 | 17 |
| MFR (dg/min) | 0.004 | 0.95 | 4.11 | 0.005 | 0.024 | 1.80 | 25.9 | 0.043 | 0.117 | 1.52 | 16.3 |
| Shear Viscosity, Pa · s | | | | | | | | | | | |
| @23.7 s$^{-1}$ | 1560 | 908 | 522 | 1420 | 1060 | 822 | 427 | 933 | 662 | 495 | 328 |
| @71.1 s$^{-1}$ | 693 | 423 | 277 | 654 | 493 | 393 | 226 | 445 | 339 | 268 | 199 |
| @237 s$^{-1}$ | 284 | 186 | 136 | 269 | 212 | 180 | 128 | 185 | 152 | 133 | 102 |
| @711 s$^{-1}$ | 128 | 90.3 | 71.0 | 121 | 96.1 | 88.5 | 66.8 | 80.7 | 69.9 | 63.9 | 57.4 |
| @2370 s$^{-1}$ | 57.9 | 43.7 | 36.7 | 50.6 | 43.9 | 41.1 | 33.8 | 31.9 | 29.3 | 28.0 | 28.8 |
| $T_m$, ° C. | 153 | 159 | 155 | 154 | 153 | 156 | 155 | 157 | 155 | 157 | 156 |
| HDT (66 psi), ° C. | 39 | *** | *** | 42 | *** | *** | *** | 35 | 33 | 31 | *** |
| Vicat (200 g), ° C. | 153 | 140 | 114 | 150 | 137 | 127 | 118 | 147 | 139 | 131 | 114 |

*** Too soft to test HDT

TABLE 4

| | Example | | | | | | | | | | | |
|---|---|---|---|---|---|---|---|---|---|---|---|---|
| | 3-1 | 3-2 | 3-3 | 3-4 | 3-5 | 3-6 | 3-7 | 3-8 | 3-9 | 3-10 | 3-11 | 3-12 |
| TPV1 | 100 | 90 | 90 | 90 | — | — | — | — | — | — | — | — |
| TPV2 | — | — | — | — | 100 | 90 | 90 | 90 | — | — | — | — |
| TPV3 | — | — | — | — | — | — | — | — | 100 | 90 | 90 | 90 |
| PDC2 | — | 10 | — | — | — | 10 | — | — | — | 10 | — | — |
| PDC3 | — | — | 10 | — | — | — | 10 | — | — | — | 10 | — |
| PDC4 | — | — | — | 10 | — | — | — | 10 | — | — | — | 10 |
| 1% Sec Mod, MPa | 54.4 | 37.9 | 40.4 | 41.4 | 27.9 | 20.1 | 22.8 | 22.9 | 52.1 | 39.1 | 41.7 | 41.4 |
| Shore A Hardness | 77 | 77 | 77 | 78 | 64 | 68 | 68 | 69 | 81 | 81 | 80 | 81 |
| 100% Modulus, MPa | 4.97 | 4.89 | 5.11 | 5.12 | 3.56 | 3.45 | 3.65 | 3.54 | 4.04 | 2.36 | 4.28 | 4.16 |
| 300% Modulus, MPa | — | 6.69 | 7.06 | 7.00 | — | 5.10 | 5.47 | 5.34 | 5.54 | 3.30 | 5.55 | 5.38 |
| Tensile Strength, MPa | 6.82 | 7.65 | 8.07 | 7.83 | 4.84 | 5.10 | 5.55 | 5.52 | 6.49 | 6.23 | 6.80 | 6.89 |
| Elongation at Break, % | 290 | 390 | 390 | 370 | 230 | 300 | 310 | 320 | 400 | 430 | 430 | 450 |
| Tensile Toughness, MPa | 22 | 32 | 34 | 31 | 12 | 16 | 18 | 18 | 27 | 29 | 31 | 32 |
| MFR (dg/min) | 0.004 | 1.86 | 0.51 | 0.86 | 0.005 | 1.77 | 1.60 | 2.99 | 0.04 | 1.03 | 1.09 | 0.72 |
| Shear Viscosity, Pa · s | | | | | | | | | | | | |
| @23.7 s$^{-1}$ | 1560 | 956 | 1140 | 1020 | 1420 | 904 | 1060 | 973 | 933 | 507 | 698 | 551 |
| @71.1 s$^{-1}$ | 693 | 441 | 533 | 470 | 654 | 433 | 493 | 464 | 445 | 271 | 363 | 297 |
| @237 s$^{-1}$ | 284 | 189 | 234 | 204 | 269 | 191 | 221 | 207 | 185 | 129 | 168 | 141 |
| @711 s$^{-1}$ | 128 | 91.3 | 111 | 99.4 | 121 | 90.7 | 106 | 98.8 | 80.7 | 61.8 | 79.6 | 67.3 |
| @2370 s$^{-1}$ | 57.9 | 43.8 | 51.6 | 47.5 | 50.6 | 41.3 | 47.0 | 44.6 | 31.9 | 27.0 | 33.1 | 29.2 |
| $T_m$, ° C. | 153 | 155 | 158 | 157 | 154 | 156 | 154 | 153 | 157 | 155 | 158 | 158 |
| HDT (66 psi), ° C. | 39 | 32 | 34 | 33 | 42 | 34 | 38 | 37 | 35 | 33 | 36 | 34 |
| Vicat (200 g), ° C. | 153 | 140 | 141 | 143 | 150 | 126 | 127 | 125 | 147 | 131 | 134 | 135 |

Methods for tables 5 and 6: The samples were extruded and pelletized on the 0.5 inch Polylab twin screw extruder (L/D=30) using zone temperatures from 250° C. to 215° C. The extrudate strand was pelletized using an underwater pelletizer. Other methods are the same as described above.

TABLE 5

| | Example | | | | | | | | | | | |
|---|---|---|---|---|---|---|---|---|---|---|---|---|
| | 4-1 | 4-2 | 4-3 | 4-4 | 4-5 | 4-6 | 4-7 | 4-8 | 4-9 | 4-10 | 4-11 | 4-12 |
| TPV1 | 100.0 | 95.0 | 90.0 | 80.0 | | | | | | | | |
| TPV2 | | | | | 100.0 | 95.0 | 90.0 | 80.0 | | | | |
| TPV3 | | | | | | | | | 100.0 | 95.0 | 90.0 | 80.0 |
| PDC5 | 0.0 | 5.0 | 10.0 | 20.0 | 0.0 | 5.0 | 10.0 | 20.0 | 0.0 | 5.0 | 10.0 | 20.0 |
| MFR (230 C., 2.16 kg), dg/min | NA | NA | NA | 7.4 | NA | NA | NA | 3.08 | NA | NA | NA | 11.51 |
| Hardness, shore A | 77 | 77 | 77 | 75 | 65 | 65 | 66 | 66 | 80 | 81 | 80 | 78 |
| Tensile Strength, MPa | 7.36 | 7.70 | 8.22 | 9.69 | 4.95 | 5.51 | 6.25 | 7.93 | 6.47 | 6.65 | 7.84 | 9.14 |
| Ultimate Elongation (%) | 245.2 | 299.8 | 372.6 | 495.9 | 181.7 | 260.1 | 363.6 | 508.5 | 389.4 | 405.0 | 486.1 | 552.5 |
| Modulus (MPa) | 73.2 | 60.4 | 43.0 | 31.7 | 39.3 | 30.7 | 24.1 | 18.8 | 56.3 | 48.0 | 40.3 | 29.3 |
| Flexural Modulus (MPa) | 64.7 | 55.1 | 41.5 | 30.4 | 35.5 | 28.7 | 22.8 | 18.2 | 52.4 | 44.9 | 38.0 | 28.4 |
| Hysterisis, Cycle 1 | | | | | | | | | | | | |
| Tension Set % | 68 | 65 | 65 | 63 | 58 | 56 | 54 | 52 | 62 | 63 | 63 | 59 |
| Total Energy (J) | 6.0 | 5.8 | 5.6 | 5.0 | 4.0 | 3.7 | 3.5 | 3.4 | 4.3 | 4.3 | 4.4 | 4.2 |
| Hysterisis, Cycle 2 | | | | | | | | | | | | |
| Tension Set % | 55 | 54 | 54 | 52 | | 39 | 36 | 34 | 55 | 59 | 57 | 53 |
| Total Energy (J) | 3.8 | 3.7 | 3.6 | 3.3 | | 2.3 | 2.1 | 2.0 | 2.8 | 2.9 | 2.9 | 2.8 |

TABLE 6

| | Example | | | | | | | | | | | |
|---|---|---|---|---|---|---|---|---|---|---|---|---|
| | 5-1 | 5-2 | 5-3 | 5-4 | 5-5 | 5-6 | 5-7 | 5-8 | 5-9 | 5-10 | 5-11 | 5-12 |
| TPV1 | 100.0 | 95.0 | 90.0 | 80.0 | | | | | | | | |
| TPV2 | | | | | 100.0 | 95.0 | 90.0 | 80.0 | | | | |
| TPV3 | | | | | | | | | 100.0 | 95.0 | 90.0 | 80.0 |
| PDC6 | 0.0 | 5.0 | 10.0 | 20.0 | 0.0 | 5.0 | 10.0 | 20.0 | 0.0 | 5.0 | 10.0 | 20.0 |
| Hardness shore A | 77 | 76 | 74 | 71 | 66 | 64 | 64 | 63 | 80 | 79 | 78 | 74 |
| Tensile Strength MPa | 7.44 | 7.51 | 7.65 | 8.40 | 4.78 | 5.30 | 5.80 | 6.45 | 6.25 | 6.63 | 7.46 | 7.99 |
| Ultimate Elongation (%) | 259.6 | 282.3 | 365.1 | 481.4 | 175.9 | 247.5 | 348.2 | 454.9 | 365.7 | 418.7 | 492.0 | 541.5 |
| Moduls (MPa) | 68.0 | 56.9 | 37.9 | 23.8 | 37.6 | 30.5 | 23.6 | 15.3 | 57.3 | 42.1 | 32.7 | 20.4 |
| Flexural Modulus (MPa) | 62.8 | 54.5 | 36.2 | 23.2 | 34.5 | 28.1 | 21.7 | 14.8 | 52.6 | 39.7 | 30.9 | 19.7 |
| Hysterisis, Cycle 1 | | | | | | | | | | | | |
| Tension Set % | 66 | 65 | 63 | 57 | 56 | 55 | 53 | 49 | 65 | 64 | 61 | 55 |
| TotalEnergy (J) | 5.9 | 5.8 | 5.2 | 4.5 | 3.8 | 3.6 | 3.3 | 2.9 | 4.3 | 4.2 | 4.0 | 3.5 |
| Hysterisis, Cycle 2 | | | | | | | | | | | | |
| Tension Set % | 54 | 53 | 49 | 41 | 35 | 33 | 31 | 27 | 57 | 55 | 51 | 41 |
| TotalEnergy (J) | 3.7 | 3.6 | 3.3 | 2.7 | 2.2 | 2.1 | 1.9 | 1.6 | 2.9 | 2.8 | 2.6 | 2.2 |

For example 6 below the method of preparation of the samples is described below. The ingredients were weighed and tumble blended together. The tumbled blend was then placed in the hopper of a 1 inch extruder, 20 L/D to melt, mix, and homogenize the ingredients at a barrel temperature of about 215° C. The residence time in the extruder was about 60 seconds. The melt was extruded into rods, cooled in an underwater trough and pelletized. The pellets for each sample were then injection molded using standard Exxon-Mobil procedures based on ASTM D364.

The extrudate was tested for properties according to the procedures described above at the beginning of the examples section except as noted below.

TABLE 7

| | Example | | | | | | | |
|---|---|---|---|---|---|---|---|---|
| | 6-1 | 6-2 | 6-3 | 6-4 | 6-5 | 6-6 | 6-7 | 6-8 |
| ICP1 | 50 | 50 | 50 | 50 | 50 | 50 | 25 | 75 |
| E2 | 50 | 45 | 40 | 30 | 15 | 0 | 0 | 0 |
| PDC 7 | 0 | 5 | 10 | 20 | 35 | 50 | 75 | 25 |
| MFR | 3.7 | 4.6 | 5.2 | 12 | 20 | 51.0 | — | 12.9 |
| STIFFNESS & TENSILE | | | | | | | | |
| 1% sec flexural mod kpsi | 17 | 14 | 13 | 13 | 11 | 11 | — | 35 |
| Hardness - shore D (5 sec) | 32 | 35 | 33 | 31 | 31 | 30 | — | 40.00 |
| HDT @ 66 psi (deg C.) | 40 | 38 | 38 | 37 | 35 | 36 | — | 43.40 |
| Tensile @ 2 in/min | | | | | | | | |
| tensile, stress at yield psi | 1,205 | 1,135 | 1,069 | 1,018 | 960 | 926 | — | 1,779 |
| strain at yield % | 40 | 42 | 43 | 44 | 47 | 45 | — | 30 |
| strain at break psi | NB | NB | NB | NB | NB | NB | — | NB |
| IMPACT STRENGTH | | | | | | | | |
| notched izod at −18 deg C. | NB | NB | NB | NB | NB | 3.15 | NB | 0.56 |
| notched izod at −30 deg C. | 0.38 | 0.37 | 0.38 | 0.38 | 3.00 | 1.53 | — | 0.37 |
| Instrumented impact: Fracture energy @ −18 C. | 28.43 | 26.5 | 25.1 | 24.6 | 23.4 | 14.88 | — | 29.05 |
| Failure type | ductile | ductile | ductile | ductile | ductile | ductile/brittle | ductile/brittle | ductile |
| Instrumented impact Fracture energy @ −29 C. | 27.86 | 27.1 | 27.0 | 28.8 | 28.5 | | | 2.46 |
| Failure type | ductile | ductile | ductile | ductile | ductile | ductile | — | brittle |
| OPTICS | | | | | | | | |
| haze | 73.50 | 67 | 62 | 57 | 55 | 60.40 | — | 75.80 |
| gloss @ 60 deg | 81.00 | 87 | 86 | 85 | 88 | sticky | — | — |

| | Example | | | | | | | | |
|---|---|---|---|---|---|---|---|---|---|
| | 6-9 | 6-10 | 6-11 | 6-12 | 6-13 | 6-14 | 6-15 | 6-16 | 6-17 |
| ICP1 | 95 | 50 | 95 | 95 | 50 | 50 | 50 | 50 | 100 |
| E2 | 0 | 0 | 0 | 5 | 35 | 0 | 0 | 0 | 0 |
| PDC 7 | 5 | 0 | 0 | 0 | 10 | 40 | 40 | 40 | 0 |

TABLE 7-continued

| | | | | | | | | | |
|---|---|---|---|---|---|---|---|---|---|
| PDC 8 | 0 | 50 | 5 | 0 | 0 | 0 | 0 | 0 | 0 |
| E1 | 0 | 0 | 0 | 0 | 0 | 10 | 0 | 0 | 0 |
| P1 | 0 | 0 | 0 | 0 | 5 | 0 | 0 | 10 | 0 |
| P2 | 0 | 0 | 0 | 0 | 0 | 0 | 10 | 0 | 0 |
| MFR (dg/min) | 4.0 | 52.6 | 4.4 | 3.7 | 9.2 | 28.7 | 73.6 | 81.9 | 3.5 |
| STIFFNESS & TENSILE | | | | | | | | | |
| secant flex mod kpsi- | 76 | 19 | 80 | 76 | 14 | 13 | 8 | 8 | — |
| Hardness - Shore D (5 sec) | 50 | 42 | 59 | 58 | 34 | 31 | 29 | 29 | — |
| HDT @ 66 psi (° C.) | 53 | 38 | 53 | 54 | 38 | 36 | 34 | 35 | — |
| Tensile @ 2 in/min | | | | | | | | | |
| tensile, stress at yield psi | 2,918 | 1,222 | 3,083 | 3,005 | 1,078 | 951 | 820 | 836 | — |
| strain at yield % | 19 | 26 | 18 | 19 | 44 | 41 | 49 | 48 | — |
| strain at break psi | NB | NB | NB | NB | NB | NB | NB | NB | 8,500 |
| IMPACT STRENGTH | | | | | | | | | |
| notched izod at −18 deg C. | 0.61 | 0.30 | 0.68 | 0.73 | nb | 4.38 | nb | nb | — |
| notched izod at −30° C. | 0.43 | 0.34 | 0.48 | 0.40 | 4.78 | 1.28 | 3.80 | 4.70 | — |
| Instrumented impact: Fracture energy @ −18° C. | 2.91 | 1.55 | 3.50 | 3.13 | 24.54 | 23.69 | 21.83 | 25.49 | — |
| Fracture mode | brittle | brittle | brittle | brittle | ductile | ductile | ductile | ductile | ductile |
| Instrumented impact Fracture energy @ −29° C. | — | — | — | — | 26.31 | — | 23.44 | 23.28 | — |
| Fracture mode | — | — | — | — | ductile | ductile | ductile | ductile | ductile |
| OPTICS | | | | | | | | | |
| haze | 87.20 | 59.50 | 89.30 | 89.50 | 64.20 | 70.60 | 58.60 | 59.60 | — |
| gloss @ 60° | 81.40 | 90.10 | 86.30 | 82.80 | 83.90 | 81.40 | — | — | 90.00 |

TABLE 8

| | Example 7- | | | | | | |
|---|---|---|---|---|---|---|---|
| | 1 | 2 | 3 | 4 | 5 | 6 | 7 |
| Composition | | | | | | | |
| PDC 9 | 11 | 11 | 11 | 79 | 79 | 79 | 128 |
| ICP1 | | | 214 | | | 146 | |
| ICP2 | 214 | | | 146 | | | 70 |
| ICP3 | | 214 | | | 146 | | |
| Properties | | | | | | | |
| Strain @ break % | 69 | 37 | 92 | 219 | 535 | 1289 | 1332 |
| Tensile, psi | 2170 | 2079 | 1954 | 2011 | 1883 | 2457 | 2244 |
| Flex Modulus (k psi) | 134 | 110 | 94 | 64 | 54 | 50 | 13 |
| T½ min | | 1.5 | 0.37 | 0.18 | 3.1 | 0.47 | 0.07 |

TABLE 9

| | Example 8- | | | | | | | | |
|---|---|---|---|---|---|---|---|---|---|
| | 1 | 2 | 3 | 4 | 5 | 6 | 7 | 8 | 9 |
| Composition | | | | | | | | | |
| PDC10 | 90 | 11 | 11 | 11 | 79 | 79 | 79 | 128 | 128 |
| ICP1 | | | | 214 | | | 146 | | |
| ICP2 | | 214 | | | 146 | | | | |
| ICP3 | 108 | | 214 | | | 146 | | 70 | 70 |
| P3 | 27 | | | | | | | | |
| Properties | | | | | | | | | |
| Strain @ break % | 142 | 47 | 24 | 103 | 199 | 91 | 1055 | 577 | 186 |
| Tensile, psi | 645 | 1839 | 1714 | 1843 | 1684 | 1080 | 1696 | 707 | 346 |
| Flex Modulus (kpsi) | 12 | 130 | 92 | 86 | 48 | 35 | 34 | 9 | 4 |
| T½ Min | — | — | 1.3 | 0.98 | | 1.6 | 3 | 0.25 | 0.18 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A polymeric composition comprising:
   from about 20 to about 50 wt %, based on the total weight of hydrocarbons in the polymeric composition, of a propylene-dominated copolymer component comprising a blend of two propylene-dominated copolymers made in the presence of a bridged metallocene catalyst, each propylene-dominated copolymer comprising from 5 to 35 wt % of comonomer derived units selected from the group consisting of ethylene and $C_4$ to $C_{20}$ olefins, and from 95 to 65 wt % propylene derived units, by weight of the respective copolymer,
   wherein the propylene-dominated copolymer component has an MFR from 2000 to 7500 dg/min, a heat of fusion between 4.0 and 40 J/g, an isotactic triad fraction of at least 75 percent, a melting point greater than 35° C. and less than 75° C. a tacticity index (m/r) from 4 to 12 an intermolecular tacticity such that at least 75 wt % of the copolymer component is soluble in two adjacent temperature fractions of a thermal fractionation carried out in hexane in 8° C. increments, a reactivity ratio product $r_1 r_2$ of less than 1.5 and a molecular weight distribution Mw/Mn between 1.5 and 6;
   wherein the two propylene-dominated copolymers differ by at least one of comonomer content, Mw, Mn, Tm, Hf, Mw/Mn, 2,1 insertions, 3,1 insertions, and tensile modulus, wherein the difference is 100% or greater; and
   wherein the propylene-dominated copolymer component has less than 10000 ppm by weight of the copolymer component of a molecular degradation agent or its reaction products;
   in intimate admixture therewith, from about 50 to about 80 wt %, based on the total weight of hydrocarbons in the polymeric composition, of a soft thermoplastic blend component comprising (1) a continuous thermoplastic matrix phase comprising a propylene homopolymer, propylene copolymer, or mixture thereof, having a melting point greater than about 110° C. and (2) a dispersed elastomeric phase selected from the group consisting of natural rubber, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), nitrile rubber, propylene oxide polymers, star-branched butyl rubber, halogenated star-branched butyl rubber, brominated butyl rubber, chlorinated butyl rubber, star-branched polyisobutylene rubber, star-branched brominated butyl (polyisobutylene/isoprene copolymer) rubber, poly(isobutylene-co-p-methylstyrene), halogenated poly(isobutylene-co-p-methylstyrene), and mixtures thereof, wherein the dispersed elastomeric phase is dispersed as particles having an average (mean) diameter of less than 10 μm within the continuous thermoplastic matrix phase, and where the soft thermoplastic blend component has a MFR less than 200 g/10 min,
   wherein the polymeric composition has an MFR of at least 1 dg/min and less than or equal to 81.9 dg/min and a 1% secant flexural modulus of from 1 to 100 MPa.

2. The polymeric composition of claim 1 wherein the polymeric composition has a Tm within 10° C. of the soft thermoplastic blend component.

3. The polymeric composition of claim 1 wherein the polymeric composition has the MFR greater than the MFR of the soft thermoplastic blend component, a tensile toughness greater than the tensile toughness of the soft thermoplastic blend component, or both.

4. The polymeric composition of claim 1 having the MFR of greater than 5 dg/min and less than or equal to 81.9 dg/min and a Tc of greater than 75° C.

5. The polymeric composition of claim 1 wherein the composition has a Tc greater than 60° C.

6. The polymeric composition of claim 1 wherein the polymeric composition has one or more of the following characteristics: a) a tensile strength of less than 40 MPa; b) an Ultimate Elongation of greater than 30%; and c) a 300% modulus of less than 14 MPa.

7. The polymeric composition of claim 1 wherein the soft thermoplastic blend component comprises from about 55 to about 80 wt % of the composition and the propylene dominated copolymer component comprises from about 20 to about 45 wt % of the composition, based on the total weight of hydrocarbons in the polymeric composition.

8. The polymeric composition of claim 1 wherein at least one of the two propylene-dominated copolymers comprises at least 75 to 95 wt % of the propylene-derived units by weight of the respective propylene-dominated copolymer.

9. The polymeric composition of claim 1 wherein at least one of the two propylene-dominated copolymers comprises from about 5 wt % to about 20 wt % ethylene-derived units by weight of the respective propylene-dominated copolymer.

10. The polymeric composition of claim 1 wherein at least one of the two propylene-dominated copolymers comprises from about 0.5 to about 3 wt % diene derived units by weight of the respective propylene-dominated copolymer.

11. The polymeric composition of claim 1 wherein the propylene-dominated copolymer component comprises one or more of the following characteristics:
    an elasticity in percent equal to or less than 0.935M +12 where M is the 500% tensile modulus in MPa and is at least 0.5 MPa;
    a proportion of inversely inserted propylene units greater than 0.5%, based on 2,1 insertion of propylene monomer in all propylene insertions;
    a proportion of inversely inserted propylene units greater than 0.05%, based on 1,3 insertion of propylene monomer in all propylene insertions.

12. The polymeric composition of claim 1 wherein the continuous thermoplastic matrix phase of the soft thermoplastic blend component comprises an isotactic polypropylene or an isotactic random copolymer of propylene and from 0% to 9% wt by weight of the thermoplastic phase of an alpha-olefin, wherein the thermoplastic matrix phase has a melting point greater than about 120° C. and an MFR of from 0.1 to 150 dg/min.

13. The polymeric composition of claim 1 wherein the continuous thermoplastic matrix phase of the soft thermoplastic blend component comprises from about 1 to about 98 wt % based on the weight of the soft thermoplastic blend component of the propylene homopolymer, the propylene copolymer, or mixture thereof, wherein the propylene homopolymer, the propylene copolymer, or mixture thereof has a melting point greater than about 120° C., and wherein the propylene copolymer is selected from the group consisting of random propylene copolymers and propylene-styrene block copolymers.

14. The polymeric composition of claim 13 wherein the the propylene homopolymer, the propylene copolymer, or mixture thereof is selected from the group consisting of (a) isotactic polypropylene homopolymer, and (b) random copolymer of propylene and the comonomer selected from the group consisting of ethylene and $C_4$ to $C_{20}$ olefins, wherein the random copolymer contains at least 90% by weight of the random copolymer of the propylene derived units.

15. The polymeric composition of claim 1 wherein the elastomeric phase of the soft thermoplastic blend component is vulcanized.

16. A process for making the polymeric composition of claim 1, comprising melt blending the propylene-dominated copolymer component and the soft thermoplastic blend component.

17. The process of claim 16 further comprising forming a film, fabric, fiber, sheet, molded object, extruded form or thermoformed article from the melt.

18. The polymeric composition obtained from the process of claim 16.

19. The polymeric composition of claim 1 in a film, fabric, fiber, sheet, molded object, extruded form or thermoformed article.

20. An automotive part comprising the composition of claim 1, wherein the automotive part is selected from the group consisting of bumper fascia, interior door skins, air bag covers, and side pillars.

\* \* \* \* \*